United States Patent
Sun et al.

(10) Patent No.: US 12,068,808 B2
(45) Date of Patent: Aug. 20, 2024

(54) DATA SENDING METHOD, APPARATUS, DEVICE, AND READABLE STORAGE MEDIUM

(71) Applicant: HUAWEI TECHNOLOGIES CO., LTD., GuangDong (CN)

(72) Inventors: Yunfeng Sun, Shanghai (CN); Qingtian Xue, Xi'an (CN); Wei Yu, Xi'an (CN); Min Wen, Shanghai (CN); Gang Wei, Shenzhen (CN); Qunfang Lou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 27 days.

(21) Appl. No.: 18/156,757

(22) Filed: Jan. 19, 2023

(65) Prior Publication Data

US 2023/0155633 A1   May 18, 2023

Related U.S. Application Data

(63) Continuation of application No. PCT/CN2021/098370, filed on Jun. 4, 2021.

(30) Foreign Application Priority Data

Jul. 22, 2020 (CN) .......................... 202010710423.8

(51) Int. Cl.
H04B 7/024 (2017.01)
(52) U.S. Cl.
CPC .................... H04B 7/024 (2013.01)
(58) Field of Classification Search
CPC .............................. H04B 7/024; H04B 7/0626
See application file for complete search history.

(56) References Cited

U.S. PATENT DOCUMENTS

| 2018/0115397 A1 | 4/2018 | Harris et al. |
| 2019/0149256 A1 | 5/2019 | Davydov |
| 2020/0106487 A1* | 4/2020 | Christodoulou ....... H04B 7/024 |

FOREIGN PATENT DOCUMENTS

| CN | 101882951 A | 11/2010 |
| CN | 103718635 A | 4/2014 |

(Continued)

OTHER PUBLICATIONS

Huan Sun et al., "Distributed Pre-Coder Design for Multi-Cell Joint Transmission with Interference Controlling," IEICE Trans. Commun., vol. E93-B. No. 11, Nov. 2010; 4 pages.

(Continued)

*Primary Examiner* — Rahel Guarino
(74) *Attorney, Agent, or Firm* — Rimon PC

(57) ABSTRACT

Embodiments of this application provide a data sending method, an apparatus, a device, and a readable storage medium. A server determines a first transmission point from a coordinated set, and determines a first downlink sending weight of the first transmission point. Then, the server determines a second downlink sending weight of a second transmission point based on the first downlink sending weight, and sends the second downlink sending weight to the second transmission point. When sending a data stream to an electronic device, the second transmission point determines a downlink sending weight corresponding to the data stream from a matrix, weights the data stream, and sends the weighted data stream to the electronic device.

17 Claims, 7 Drawing Sheets

(56) References Cited

FOREIGN PATENT DOCUMENTS

| | | |
|---|---|---|
| CN | 103840919 A | 6/2014 |
| CN | 104321993 A | 1/2015 |
| CN | 104519504 A | 4/2015 |
| CN | 105392200 A | 3/2016 |
| WO | 2011038699 A1 | 4/2011 |
| WO | 2012096449 A2 | 7/2012 |
| WO | 2018117666 A1 | 6/2018 |

OTHER PUBLICATIONS

Huawei, HiSilicon, "Overview on further enhancements to Coordinated Multi-Point operation," 3GPP TSG RAN WGI Meeting #85, Nanjing, China, May 23-27, 2016, RI-164084; 3 pages.

\* cited by examiner

DATA SENDING METHOD, APPARATUS, DEVICE, AND READABLE STORAGE MEDIUM

CROSS-REFERENCE TO RELATED APPLICATIONS

This application is a continuation of International Application No. PCT/CN2021/098370, filed on Jun. 4, 2021, which claims priority to Chinese Patent Application No. 202010710423.8, filed on Jul. 22, 2020. The disclosures of the aforementioned applications are herein incorporated by reference in their entireties.

TECHNICAL FIELD

Embodiments of this application generally relate to the field of communications technologies, and in particular, to a data sending method, an apparatus, a device, and a readable storage medium.

BACKGROUND

A coordinated multipoint transmission (CoMP) technology is a technology in which a plurality of geographically separated transmission points perform coordinated transmission to serve one or more electronic devices.

A joint transmission (JT) technology is a type of CoMP technology, and the JT technology is classified into either a coherent joint transmission (CJT) technology or a non-coherent joint transmission (NCJT) technology. In the NCJT technology, transmission points in a coordinated set send downlink data to an electronic device, and the transmission points in the coordinated set include a serving transmission point and at least one coordinated transmission point. In a downlink data sending process, each transmission point independently obtains a downlink sending weight of each transmission point, weights a data stream by using the downlink sending weight, and sends the weighted data stream to the electronic device through a channel between the transmission point and the electronic device. A plurality of data streams may be transmitted on a same channel, and data streams on the same channel correspond to different downlink sending weights. For an electronic device, a receiving direction in which the electronic device receives the data stream is related to the downlink sending weight and the channel, and the receiving direction is also referred to as a receiving subspace or the like. Correspondingly, a sending direction in which the transmission point sends the data stream is related to the downlink sending weight and the channel, and the sending direction is also referred to as a sending subspace or the like.

When a plurality of transmission points all send data streams to the electronic device, because downlink sending weights of the transmission points in the coordinated set are calculated independently, receiving directions in which the electronic device receives the data streams are non-orthogonal. Consequently, interference between the data streams is excessively large, and the electronic device cannot correctly receive data.

SUMMARY

Embodiments of this application provide a data sending method, an apparatus, a device, and a readable storage medium, to process downlink sending weights of transmission points, so that when an electronic device receives data streams sent by transmission points in a coordinated set, receiving directions of different data streams are orthogonal or approximately orthogonal, thereby resolving a problem that interference between data streams of different transmission points is excessively large when the electronic device receives the data streams, and achieving an objective of correctly receiving data by the electronic device.

According to a first aspect, an embodiment of this application provides a data sending method. The method is applied to a second transmission point or a chip in a second transmission point. The following describes the method by using the second transmission point as an example. The method includes that the second transmission point receives a second downlink sending weight from a server, weights a data stream based on the second downlink sending weight, and sends the weighted data stream to an electronic device. The second downlink sending weight is determined by the server based on a first downlink transmit weight. In this process, the server determines the second downlink sending weight of the second transmission point based on the first downlink sending weight of a first transmission point, so that when the electronic device receives data streams sent by transmission points in a coordinated set, receiving directions of different data streams are orthogonal or approximately orthogonal, thereby resolving a problem that interference between data streams of different transmission points is excessively large when the electronic device receives the data streams, and achieving an objective of correctly receiving data by the electronic device.

In a feasible design, the second transmission point receives the second downlink sending weight from the server; or the second transmission point receives the second downlink sending weight from a third transmission point, where the third transmission point is a serving transmission point in the coordinated set. According to this solution, the server or the transmission point flexibly determines the second downlink sending weight.

According to a second aspect, an embodiment of this application provides a data sending method. The method is applied to a server or a chip in a server. The following describes the method by using a server as an example. The method includes that the server determines a first transmission point from a coordinated set, and determines a first downlink sending weight of the first transmission point. Then, for any second transmission point in the coordinated set, the server determines a second downlink sending weight of the second transmission point based on the first downlink sending weight, and sends the second downlink sending weight to the second transmission point. The second downlink sending weight is a matrix, and different columns in the matrix represent downlink sending weights of different data streams. When sending a data stream to an electronic device, the second transmission point determines a downlink sending weight corresponding to the data stream from the matrix, weights the data stream, and sends the weighted data stream to the electronic device. In this process, the server determines the second downlink sending weight of the second transmission point based on the first downlink sending weight of the first transmission point, so that when the electronic device receives data streams sent by transmission points in the coordinated set, receiving directions of different data streams are orthogonal or approximately orthogonal. This may resolve a problem that interference between data streams of different transmission points is excessively large when the electronic device receives the data streams, and achieving an objective of correctly receiving data by the electronic device.

In a feasible design, when determining the second downlink sending weight of the second transmission point based on the first downlink sending weight of the first transmission point, the server first determines a zero-receiving subspace of a first channel based on the first downlink sending weight, where the first channel is a channel between the first transmission point and the electronic device. Then, the server determines the second downlink sending weight based on the zero-receiving subspace of the first channel. This solution ensures inter-stream orthogonality of the second transmission point, so that when the electronic device receives data streams sent by transmission points in the coordinated set, receiving directions of different data streams are orthogonal or approximately orthogonal.

In a feasible design, when determining the second downlink sending weight based on the zero-receiving subspace of the first channel, the server determines the second downlink sending weight based on the zero-receiving subspace of the first channel and a second channel matrix of a second channel, where the second channel is a channel between the second transmission point and the electronic device. According to this solution, a problem that interference between data streams of different transmission points is excessively large when the electronic device receives data streams is resolved, and an objective of correctly receiving data by the electronic device is achieved.

In a feasible design, when determining the second downlink sending weight based on the zero-receiving subspace of the first channel, the server first determines a largest receiving subspace of a second channel based on a second channel matrix of the second channel between the second transmission point and the electronic device. Then, the server projects the largest receiving subspace of the second channel to the zero-receiving subspace of the first channel, to obtain a first projection matrix, and perform Schmidt orthogonalization on the first projection matrix to obtain a first orthogonal matrix. Subsequently, the server determines the second downlink sending weight based on the first orthogonal matrix and the second channel matrix of the second channel. According to this solution, a problem that interference between data streams of different transmission points is excessively large when the electronic device receives data streams is resolved, and an objective of correctly receiving data by the electronic device is achieved.

In a feasible design, when determining the second downlink sending weight of the second transmission point based on the first downlink sending weight of the first transmission point, the server first determines a largest receiving subspace of a second channel based on a second channel matrix of the second channel between the second transmission point and the electronic device. Then, the server determines a second orthogonal matrix based on subspaces of the largest receiving subspace of the second channel, a largest receiving subspace of a first channel matrix, and the largest receiving subspace of the second channel matrix. Finally, the server determines the second downlink sending weight based on the second channel matrix and the second orthogonal matrix. The downlink sending weight of the second transmission point is processed based on the downlink sending weight of the first transmission point, so that when the electronic device receives the data stream sent by the first transmission point and the data stream sent by the second transmission point, receiving directions of different data streams are orthogonal or approximately orthogonal, thereby resolving a problem that interference between data streams of different transmission points is excessively large when the electronic device receives the data streams, and achieving an objective of correctly receiving data by the electronic device.

In a feasible design, when determining the second downlink sending weight of the second transmission point based on the first downlink sending weight of the first transmission point, the server first determines a cross covariance matrix of a first channel and a second channel based on a first channel matrix of the first channel between the first transmission point and the electronic device and a second channel matrix of the second channel between the second transmission point and the electronic device. Then, the server determines a product matrix based on the cross covariance matrix and the first downlink sending weight, where the product matrix indicates a product of a conjugate transposed matrix of the first downlink sending weight and the cross covariance matrix. Finally, the server determines the second downlink sending weight based on the product matrix. According to this solution, a problem that interference between data streams of different transmission points is excessively large when the electronic device receives data streams is resolved, and an objective of correctly receiving data by the electronic device is achieved.

In a feasible design, when determining the second downlink sending weight based on the product matrix, the server first determines a zero-sending subspace of the product matrix; and projects the second channel matrix to the zero-sending subspace of the product matrix, to obtain a second projection matrix. Then, the server determines a covariance matrix of the second projection matrix; and performs singular value decomposition (SVD) on the covariance matrix of the second projection matrix to determine the second downlink sending weight, where the second downlink sending weight is a largest sending space of the covariance matrix of the second projection matrix.

According to this solution, the second downlink sending weight is obtained from a transmit antenna dimension, and an objective of flexibly determining the second downlink transmit weight is achieved.

In a feasible design, when determining the second downlink sending weight based on the product matrix, the server determines the second downlink sending weight based on the product matrix, the first downlink sending weight, a covariance matrix of the second channel matrix, and the cross covariance matrix of the first channel and the second channel.

According to this solution, a better second downlink sending weight is obtained.

In a feasible design, when determining the second downlink sending weight of the second transmission point based on the first downlink sending weight of the first transmission point, the server projects a second channel matrix of a second channel between the second transmission point and the electronic device to a remaining receiving subspace of a first channel matrix, to obtain a third projection matrix, where the remaining receiving subspace is a space other than a largest receiving subspace of the first channel matrix in receiving spaces of the first channel matrix. Then, the server determines the second downlink sending weight based on the third projection matrix. According to this solution, a problem that interference between data streams of different transmission points is excessively large when the electronic device receives data streams is resolved, and an objective of correctly receiving data by the electronic device is achieved.

In a feasible design, when determining the second downlink sending weight based on the third projection matrix, the server performs SVD on the third projection matrix to obtain a largest receiving subspace of the third projection matrix.

Then, the server determines the second downlink sending weight based on the largest receiving subspace of the third projection matrix and the second channel matrix. The second downlink sending weight is obtained from a receive antenna dimension, and an objective of flexibly determining the second downlink transmit weight is achieved. In addition, in comparison with the manner of obtaining the second downlink sending weight from the transmit antenna dimension, this manner has lower calculation complexity.

In a feasible design, before determining the second downlink sending weight of the second transmission point based on the first downlink sending weight of the first transmission point, the server further determines a singular value matrix based on the second channel matrix of the second channel, and determines a scrambling factor based on the singular value matrix, a beam gain loss constraint condition, and an orthogonality constraint condition. The beam gain loss constraint condition indicates a condition that a gain loss meets in an inversion scrambling process, and the scrambling factor balances orthogonality between the gain loss and the receiving subspace. According to this solution, selecting a proper scrambling factor $\sigma^2$ can balance between a weight power loss and orthogonality of receiving subspaces, and a serious beam gain loss is avoided while orthogonality of the receive subspaces is ensured.

In a feasible design, when determining the second downlink sending weight based on the third projection matrix, the server performs SVD on the third projection matrix to obtain a largest sending subspace of the third projection matrix. Then, the server determines the second downlink sending weight based on the largest sending subspace of the third projection matrix and a part of receiving subspaces of the second channel matrix. In this solution, for a scenario with a high orthogonality requirement, selection of inversion subspaces should be appropriately increased to ensure orthogonality; and for a scenario with a low orthogonality requirement, selection of inversion subspaces can be appropriately reduced to reduce a beam gain loss.

In a feasible design, the server determines a disturbance factor, where the disturbance factor balances a gain loss and orthogonality of receive subspaces in a projection process. In this solution, the disturbance factor is adjusted in the projection process, to resolve a problem that interference of each transmission point in the coordinated set and the beam gain loss are excessively large, thereby flexibly balancing a gain loss and orthogonality of receiving subspaces in the projection process.

In a feasible design, before determining the second downlink sending weight of the second transmission point based on the first downlink sending weight of the first transmission point, the server determines a receive power of each transmission point in the coordinated set, to obtain a plurality of receive powers. Then, the server determines a minimum receive power from the plurality of receive powers, and uses a transmission point corresponding to the minimum receive power as the first transmission point. In this solution, a transmission point with a low receive power is preferentially selected as the first transmission point, and orthogonalization is performed on the second transmission point with a high receive power by using the first transmission point as a reference, to avoid performing orthogonalization on a first transmission point with a low receive power, thereby avoiding an increase in a beam gain loss of the first transmission point and improving codeword demodulation performance.

In a feasible design, before determining the second downlink sending weight of the second transmission point based on the first downlink sending weight of the first transmission point, the server further receives the first channel matrix from the first transmission point and the second channel matrix from the second transmission point, where the first channel matrix is a channel matrix of the first channel between the first transmission point and the electronic device, and the second channel matrix is a channel matrix of the second channel between the second transmission point and the electronic device. In this solution, a transmission point actively or passively reports a channel matrix of a channel between the transmission point and the electronic device to the server, and the server determines a downlink sending weight of each transmission point based on channel matrices, so that the channel matrices of different transmission points are not independent. Therefore, when the electronic device receives data streams sent by transmission points in the coordinated set, receiving directions of different data streams are orthogonal or approximately orthogonal, thereby resolving a problem that interference between data streams of different transmission points is excessively large when the electronic device receives the data streams, and achieving an objective of correctly receiving data by the electronic device.

In a feasible design, the first transmission point is the $1^{st}$ transmission point, in the coordinated set, whose downlink sending weight is determined by the server, and the second transmission point is the $2^{nd}$ transmission point, in the coordinated set, whose downlink sending weight is determined by the server.

In a feasible design, after determining the second downlink sending weight of the second transmission point based on the first downlink sending weight of the first transmission point, the server further determines a third downlink sending weight of a fourth transmission point, where the fourth transmission point is the 3rd transmission point, in the coordinated set, whose downlink sending weight is determined by the server. According to this solution, receiving directions of every two transmission points in the coordinated set are separated.

In a feasible design, before determining the second downlink sending weight of the second transmission point based on the first downlink sending weight of the first transmission point, the server further determines a first downlink sending weight of the first transmission point based on the first channel matrix of the first channel between the first transmission point and the electronic device, where the first downlink sending weight is a largest sending subspace of the first channel matrix. According to this solution, the first downlink sending weight is determined.

According to a third aspect, an embodiment of this application provides a communication apparatus, including: a processing unit (e.g., processing circuit), configured to: obtain a second downlink sending weight of a second transmission point, and process a data stream based on the second downlink sending weight, where the second downlink sending weight is determined based on a first downlink sending weight of a first transmission point, the first transmission point and the second transmission point belong to a same coordinated set, and each transmission point in the coordinated set serves an electronic device based on non-coherent joint transmission; and a transceiver unit (e.g., transceiver circuit), configured to send the processed data stream.

In a feasible design, the transceiver unit is further configured to receive the second downlink sending weight from a server; or the transceiver unit is further configured to receive the second downlink sending weight from a third transmission point, where the third transmission point is a serving transmission point in the coordinated set.

According to a fourth aspect, an embodiment of this application provides a communication apparatus, including: a processing unit, configured to determine a second downlink sending weight of a second transmission point based on a first downlink sending weight of a first transmission point, where the first transmission point and the second transmission point belong to a same coordinated set, and each transmission point in the coordinated set serves an electronic device based on non-coherent joint transmission; and a transceiver unit, configured to send the second downlink sending weight to the second transmission point.

In a feasible design, the processing unit is configured to: determine a zero-receiving subspace of a first channel based on the first downlink sending weight; and determine the second downlink sending weight based on the zero-receiving subspace of the first channel, where the first channel is a channel between the first transmission point and the electronic device.

In a feasible design, when determining the second downlink sending weight based on the zero-receiving subspace of the first channel, the processing unit is configured to determine the second downlink sending weight based on the zero-receiving subspace of the first channel and a second channel matrix of a second channel, where the second channel is a channel between the second transmission point and the electronic device.

In a feasible design, when determining the second downlink sending weight based on the zero-receiving subspace of the first channel, the processing unit is configured to: determine a largest receiving subspace of a second channel based on a second channel matrix of the second channel between the second transmission point and the electronic device; project the largest receiving subspace of the second channel to the zero-receiving subspace of the first channel, to obtain a first projection matrix; perform Schmidt orthogonalization on the first projection matrix to obtain a first orthogonal matrix; and determine the second downlink sending weight based on the first orthogonal matrix and the second channel matrix of the second channel.

In a feasible design, the processing unit is configured to: determine a largest receiving subspace of a second channel based on a second channel matrix of the second channel between the second transmission point and the electronic device; determine a second orthogonal matrix based on subspaces of the largest receiving subspace of the second channel, a largest receiving subspace of a first channel matrix, and the largest receiving subspace of the second channel matrix; and determine the second downlink sending weight based on the second channel matrix and the second orthogonal matrix.

In a feasible design, the processing unit is configured to: determine a cross covariance matrix of a first channel and a second channel based on a first channel matrix of the first channel between the first transmission point and the electronic device and a second channel matrix of the second channel between the second transmission point and the electronic device; determine a product matrix based on the cross covariance matrix and the first downlink sending weight, where the product matrix indicates a product of a conjugate transposed matrix of the first downlink sending weight and the cross covariance matrix; and determine the second downlink sending weight based on the product matrix.

In a feasible design, when determining the second downlink sending weight based on the product matrix, the processing unit is configured to: determine a zero-sending subspace of the product matrix; project the second channel matrix to the zero-sending subspace of the product matrix, to obtain a second projection matrix; determine a covariance matrix of the second projection matrix; and perform SVD on the covariance matrix of the second projection matrix to determine the second downlink sending weight, where the second downlink sending weight is a largest sending space of the covariance matrix of the second projection matrix.

In a feasible design, when determining the second downlink sending weight based on the product matrix, the processing unit is configured to: determine the second downlink sending weight based on the product matrix, the first downlink sending weight, a covariance matrix of the second channel matrix, and the cross covariance matrix of the first channel and the second channel.

In a feasible design, the processing unit is configured to: project a second channel matrix of a second channel between the second transmission point and the electronic device to a remaining receiving subspace of a first channel matrix, to obtain a third projection matrix; and determine the second downlink sending weight based on the third projection matrix, wherein the remaining receiving subspace is a space other than a largest receiving subspace of the first channel matrix in receiving spaces of the first channel matrix.

In a feasible design, when determining the second downlink sending weight based on the third projection matrix, the processing unit is configured to: perform SVD on the third projection matrix to obtain a largest receiving subspace of the third projection matrix; and determine the second downlink sending weight based on the largest receiving subspace of the third projection matrix and the second channel matrix.

In a feasible design, before the determining a second downlink sending weight of a second transmission point based on a first downlink sending weight of a first transmission point, the processing unit is further configured to: determine a singular value matrix based on the second channel matrix of the second channel; and determine a scrambling factor based on the singular value matrix, a beam gain loss constraint condition, and an orthogonality constraint condition, where the beam gain loss constraint condition indicates a condition that a gain loss meets in an inversion scrambling process, and the scrambling factor balances orthogonality between the gain loss and the receiving subspace.

In a feasible design, when determining the second downlink sending weight based on the third projection matrix, the processing unit is configured to: perform SVD on the third projection matrix to obtain a largest sending subspace of the third projection matrix; and determine the second downlink sending weight based on the largest sending subspace of the third projection matrix and a part of receiving subspaces of the second channel matrix.

In a feasible design, the processing unit is further configured to determine a disturbance factor, where the disturbance factor balances a gain loss and orthogonality of receive subspaces in a projection process.

In a feasible design, before the determining a second downlink sending weight of a second transmission point based on a first downlink sending weight of a first transmission point, the processing unit is further configured to: determine a receive power of each transmission point in the coordinated set, to obtain a plurality of receive powers; and determine a minimum receive power from the plurality of receive powers, and use a transmission point corresponding to the minimum receive power as the first transmission point.

In a feasible design, before the determining a second downlink sending weight of a second transmission point based on a first downlink sending weight of a first transmission point, the transceiver unit is further configured to receive the first channel matrix from the first transmission point and the second channel matrix from the second transmission point, where the first channel matrix is a channel matrix of the first channel between the first transmission point and the electronic device, and the second channel matrix is a channel matrix of the second channel between the second transmission point and the electronic device.

In a feasible design, the first transmission point is the $1^{st}$ transmission point, in the coordinated set, whose downlink sending weight is determined by the server, and the second transmission point is the $2^{nd}$ transmission point, in the coordinated set, whose downlink sending weight is determined by the server.

In a feasible design, after determining the second downlink sending weight of the second transmission point based on the first downlink sending weight of the first transmission point, the processing unit is further configured to determine a third downlink sending weight of a fourth transmission point, where the fourth transmission point is the 3rd transmission point, in the coordinated set, whose downlink sending weight is determined by the server.

In a feasible design, before determining the second downlink sending weight of the second transmission point based on the first downlink sending weight of the first transmission point, the processing unit is further configured to determine a first downlink sending weight of the first transmission point based on the first channel matrix of the first channel between the first transmission point and the electronic device, where the first downlink sending weight is a largest sending subspace of the first channel matrix.

According to a fifth aspect, an embodiment of this application provides a communication apparatus, including a processor, a memory, and a computer program that is stored in the memory and that can run on the processor. When the processor executes the program, the communication apparatus is enabled to implement the method according to the first aspect or the possible implementations of the first aspect.

According to a sixth aspect, an embodiment of this application provides a communication apparatus, including a processor, a memory, and a computer program that is stored in the memory and that can run on the processor. When the processor executes the program, the communication apparatus is enabled to implement the method according to the second aspect or the possible implementations of the second aspect.

According to a seventh aspect, an embodiment of this application provides a communication apparatus, including a logic circuit and an input interface. The input interface is configured to obtain to-be-processed data, and the logic circuit is configured to perform the method according to the first aspect or the possible implementations of the first aspect on the to-be-processed data, to obtain processed data.

In a feasible design, the communication apparatus further includes an output interface, and the output interface is configured to output the processed data.

According to an eighth aspect, an embodiment of this application provides a communication apparatus, including a logic circuit and an input interface. The input interface is configured to obtain to-be-processed data, and the logic circuit is configured to perform the method according to the second aspect or the possible implementations of the second aspect on the to-be-processed data, to obtain processed data.

In a feasible design, the communication apparatus further includes an output interface, and the output interface is configured to output the processed data.

According to a ninth aspect, an embodiment of this application provides a computer-readable storage medium. The computer-readable storage medium is configured to store a program. When being executed by a processor, the program is configured to perform the method according to the first aspect or the possible implementations of the first aspect.

According to a tenth aspect, an embodiment of this application provides a computer-readable storage medium. The computer-readable storage medium is configured to store a program. When being executed by a processor, the program is configured to perform the method according to the second aspect or the possible implementations of the second aspect.

According to a sixth aspect, an embodiment of this application provides a computer program product. When the computer program product runs on a communication apparatus, the communication apparatus is enabled to perform the method according to the first aspect and the possible implementations of the first aspect.

According to a twelfth aspect, an embodiment of this application provides a computer program product. When the computer program product runs on a communication apparatus, the communication apparatus is enabled to perform the method according to the second aspect and the possible implementations of the second aspect.

According to a thirteenth aspect, an embodiment of this application provides a communication system, including a coordinated set, an electronic device, and the communication apparatus implemented according to the fourth aspect or the possible implementations of the fourth aspect. The coordinated set includes a first transmission point and at least one second transmission point. The communication apparatus is configured to determine a second downlink sending weight of a second transmission point in the coordinated set based on a first downlink sending weight of the first transmission point in the coordinated set.

The second transmission point is configured to: weight a data stream based on the second downlink sending weight from the communication apparatus, and send the weighted data stream.

The electronic device is configured to receive the weighted data stream sent by the second transmission point.

According to the data sending method, the apparatus, the device, and the readable storage medium provided in embodiments of this application, a server determines a first transmission point from a coordinated set, and determines a first downlink sending weight of the first transmission point. Then, for any second transmission point in the coordinated set, the server determines a second downlink sending weight of the second transmission point based on the first downlink sending weight, and sends the second downlink sending weight to the second transmission point. The second downlink sending weight is a matrix, and different columns in the matrix represent downlink sending weights of different data streams. When sending a data stream to an electronic device, the second transmission point determines a downlink sending weight corresponding to the data stream from the matrix, weights the data stream, and sends the weighted data stream to the electronic device. In this process, the server determines the second downlink sending weight of the second transmission point based on the first downlink sending weight of the first transmission point, so that when the electronic device receives data streams sent by transmission points in the coordinated set, receiving directions of different data streams are orthogonal or approximately orthogonal, thereby resolving a problem that interference between data streams of different transmission points is excessively large when the electronic device receives the data streams, and achieving an objective of correctly receiving data by the electronic device.

DESCRIPTION OF EMBODIMENTS

The core of a coordinated multipoint transmission (CoMP) technology is that when an electronic device is located in a cell boundary the electronic device can receive signals from a plurality of transmission points at the same time. In addition, signals sent by the electronic device can also be simultaneously received by a plurality of transmission points. The CoMP technology can effectively increase a user-perceived rate in an overlapping area of cells. The CoMP technology includes a coherent joint transmission (CJT) technology and a non-coherent joint transmission (NCJT) technology. In the NOT technology, transmission points in a coordinated set send physical downlink shared channel (PDSCH) to an electronic device in a cell boundary, so that the electronic device obtains a power gain and an array gain. The transmission points in the coordinated set include a serving transmission point and at least one coordinated transmission point.

Figure 1:
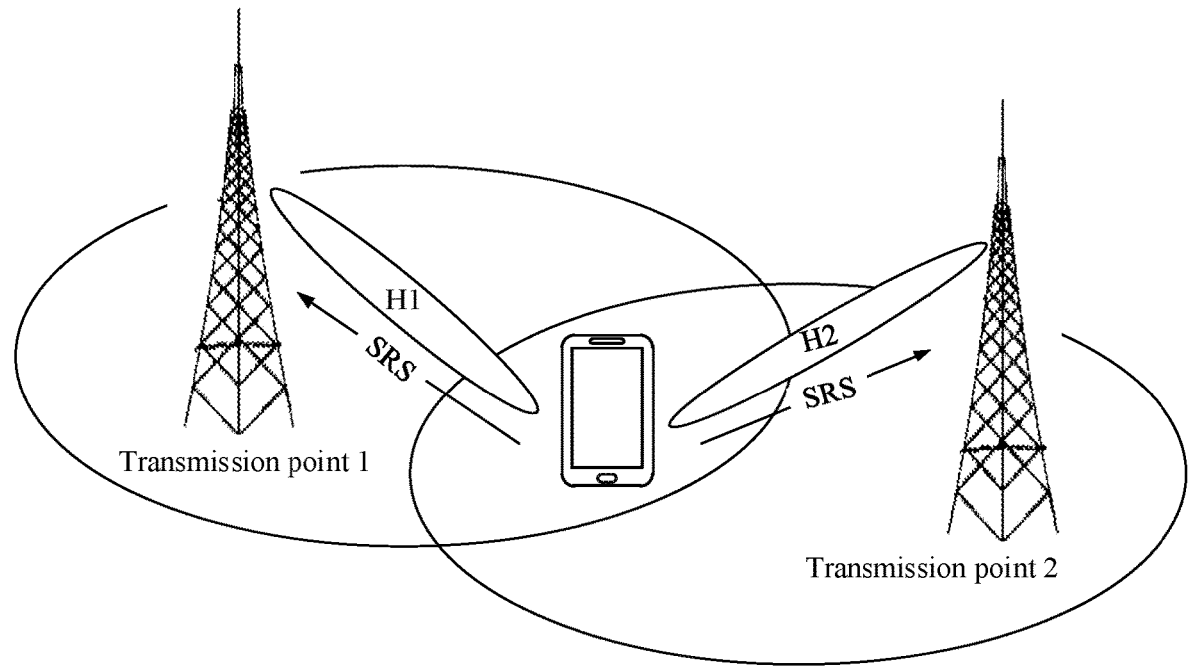
FIG. 1 is a schematic diagram of a scenario of a non-coherent joint transmission (NCJT) technology.

A further enhancement of CoMP (FeCoMP) technology is a type of NOT technology. A basic idea of the FeCoMP technology is as follows: Each transmission point in a coordinated set independently obtains a downlink sending weight, weights a data stream by using the downlink sending weight, and sends the weighted data stream through a channel between the transmission point and an electronic device. A plurality of data streams can be transmitted on a same channel, and each data stream on the same channel corresponds to a different downlink transmit weight. For example, refer to FIG. 1. FIG. 1 is a schematic diagram of a scenario of an NOT technology.

Refer to FIG. 1. The electronic device is, for example, a mobile phone, and the electronic device is located in an overlapping area between a coverage area of a transmission point 1 and a coverage area of a transmission point 2. The transmission point 1 is, for example, a serving transmission point, and the transmission point 2 is, for example, a coordinated transmission point. A downlink sending weight of the transmission point 1 is a matrix W1, and a downlink sending weight of the transmission point 2 is a matrix W2. Each column of the matrix W1 represents a downlink sending weight of one data stream, and each column of the matrix W2 represents a downlink sending weight of one data stream. For example, if the transmission point 1 sends a data stream 1 and a data stream 2 to the electronic device, the matrix W1 includes two columns, where one column is a downlink sending weight of the data stream 1, and the other column is a downlink sending weight of the data stream 2. Similarly, if the transmission point 2 sends a data stream 3 and a data stream 4 to the electronic device, the matrix W2 includes two columns, where one column is a downlink sending weight of the data stream 3, and the other column is a downlink sending weight of the data stream 4. The transmission point 1 and the transmission point 2 each receive a sounding reference signal (SRS) and the like sent by the electronic device, and separately calculate the matrix W1 and the matrix W2 by using the SRS.

Figure 2:
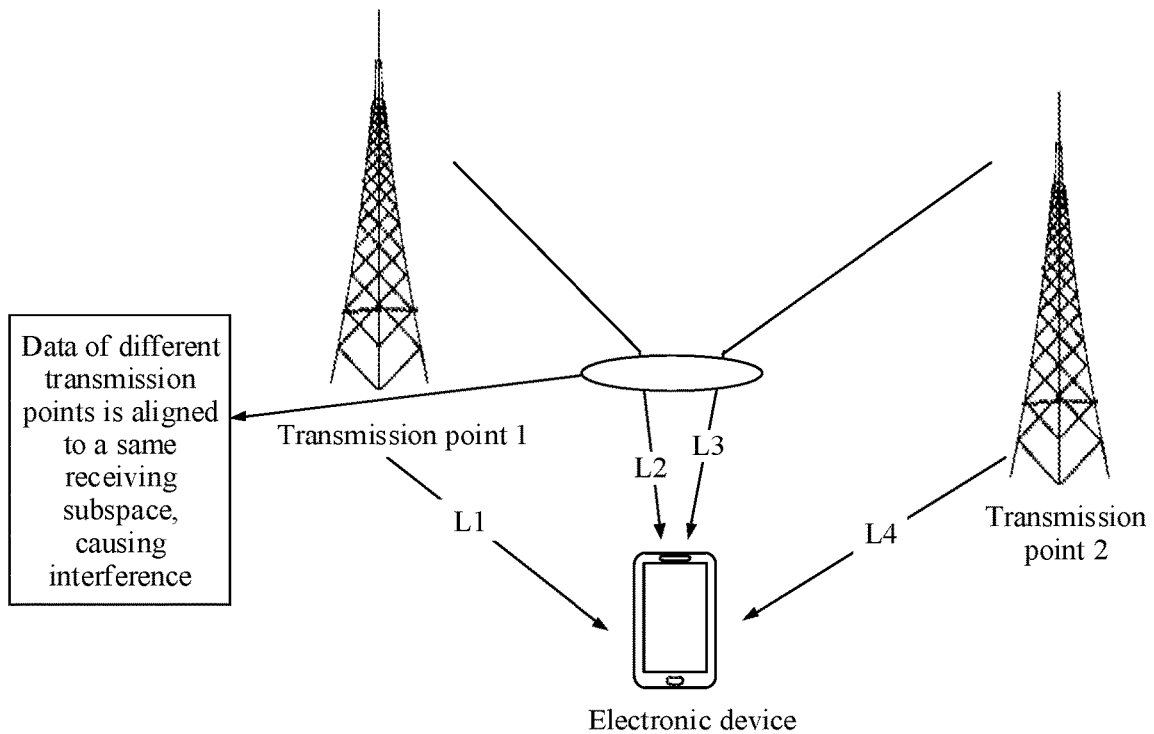
FIG. 2 is a schematic diagram of cross interference between data streams in a further enhancement of coordinated multipoint transmission (CoMP) (FeCoMP) technology.

In the FeCoMP technology, downlink sending weights of transmission points in the coordinated set are separately calculated. For a receive end, to be specific, for the electronic device, when the receiving directions in which the electronic device receives the data streams of the transmission points are non-orthogonal, great interference may exist between the data streams. For example, refer to FIG. 2. FIG. 2 is a schematic diagram of cross interference between data streams in a FeCoMP technology.

Refer to FIG. 2. L1, L2, L3, and L4 respectively represent a data stream 1, a data stream 2, a data stream 3, and a data stream 4. A transmission point 1 sends the data stream 1 and the data stream 2 to the electronic device, and a transmission point 2 sends the data stream 3 and the data stream 4 to the electronic device. The data stream 2 and the data stream 3 correspond to a same receiving subspace. Consequently, the data stream 2 and the data stream 3 interfere with each other, and the electronic device cannot correctly receive the data stream 2 and the data stream 3.

In view of this, embodiments of this application provide a data sending method, an apparatus, a device, and a readable storage medium, to process downlink sending weights of transmission points, so that when an electronic device receives data streams sent by transmission points in a coordinated set, receiving directions of different data streams are orthogonal or approximately orthogonal, thereby resolving a problem that interference between data streams of different transmission points is excessively large when the electronic device receives the data streams, and achieving an objective of correctly receiving data by the electronic device.

Figure 3A:
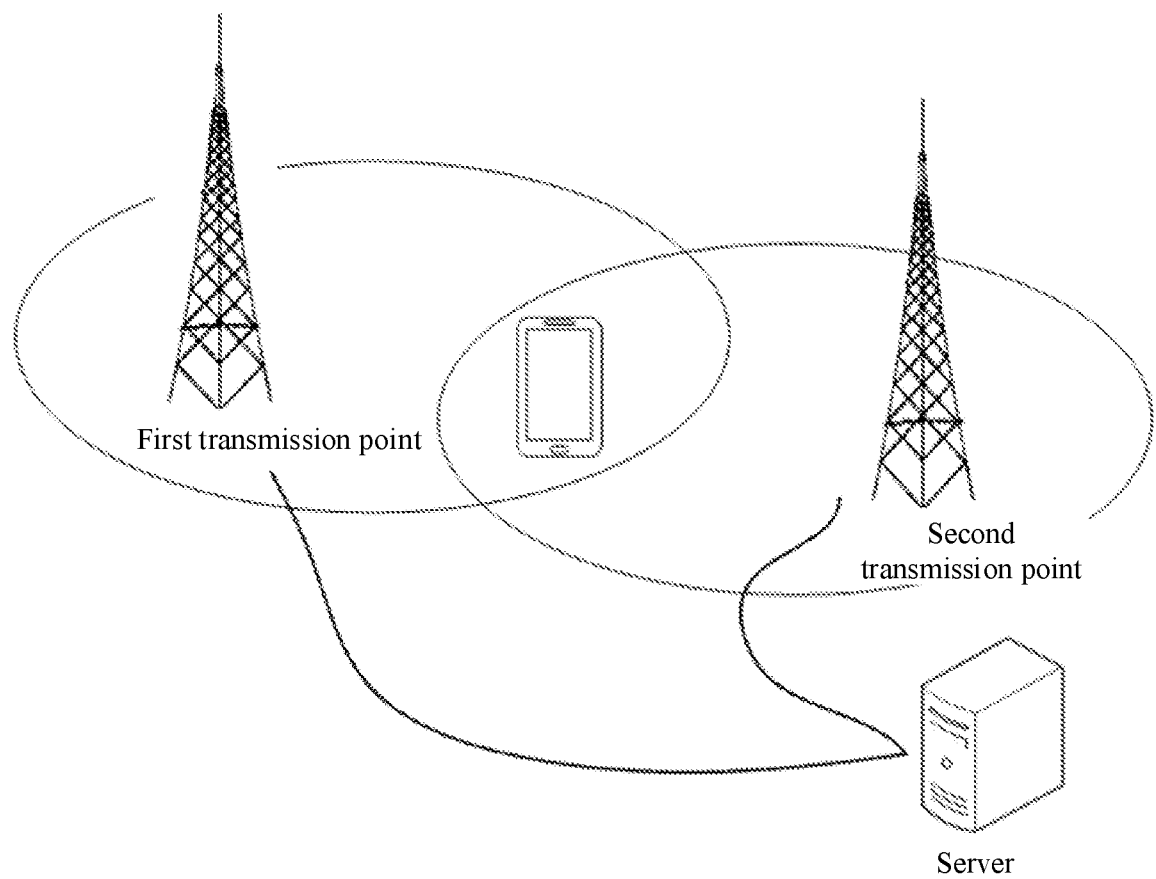
FIG. 3A is a schematic diagram of a network architecture of a data sending method according to an embodiment of this application.

FIG. 3A is a schematic diagram of a network architecture of a data sending method according to an embodiment of this application. Refer to FIG. 3A. The network architecture includes transmission points in a coordinated set, an electronic device, and a server. The coordinated set includes a serving transmission point and at least one coordinated transmission point. In FIG. 3A, a first transmission point is, for example, a serving transmission point or a coordinated transmission point, and a second transmission point is, for example, a coordinated transmission point or a serving transmission point. The server is, for example, a CoMP server. The server is deployed in a baseband unit (BBU) or a control center. The server is configured to: determine the first transmission point from a coordinated set, determine a second downlink sending weight of the second transmission point based on a first downlink sending weight of the first transmission point, and send the second downlink sending weight to the second transmission point, so that the second transmission point sends a data stream to the electronic device by using the second downlink sending weight. The network architecture is applicable to a scenario in which transmission points are controlled in a distributed manner.

Figure 3B:
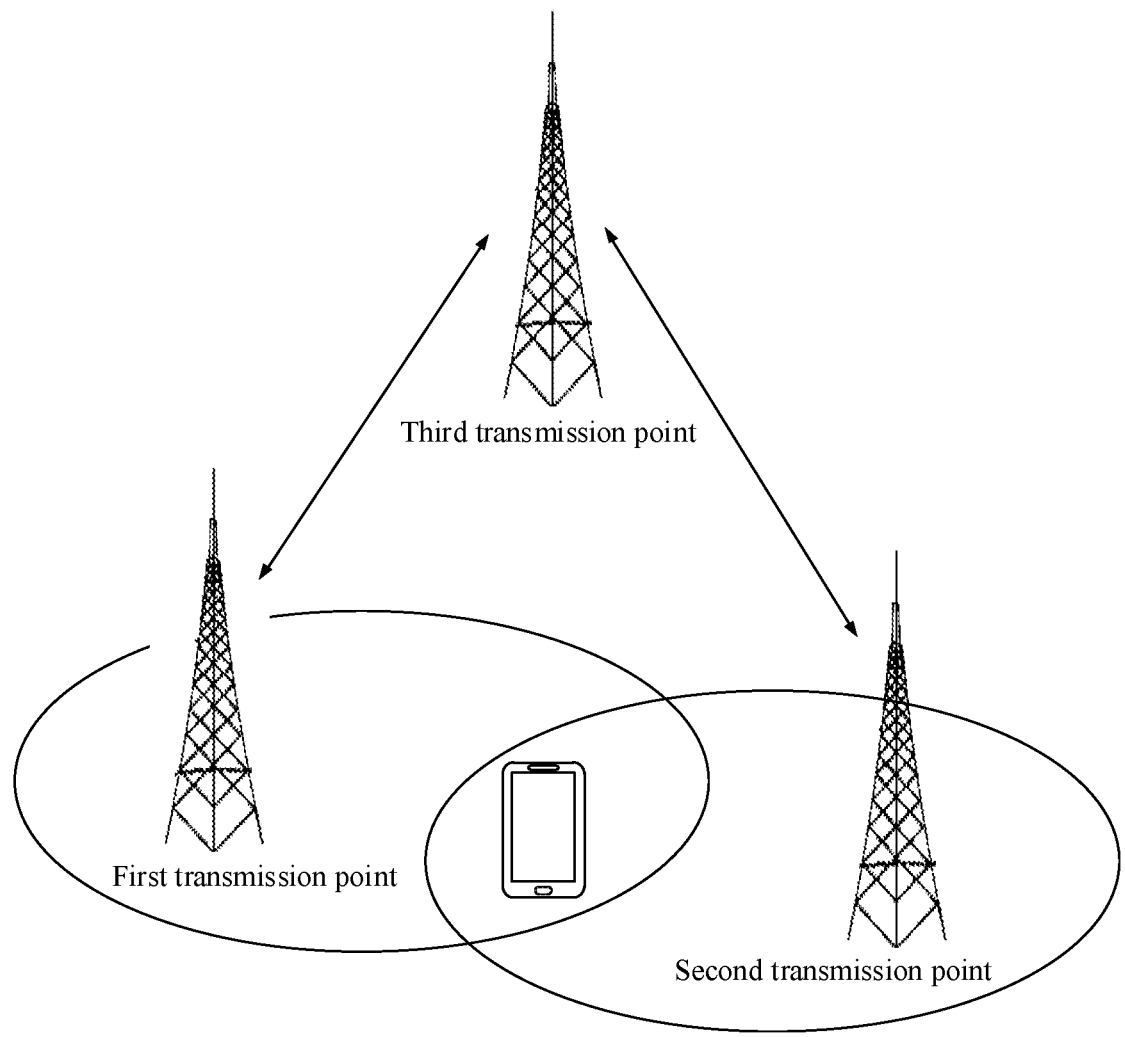
FIG. 3B is a schematic diagram of a network architecture of another data sending method according to an embodiment of this application.

FIG. 3B is a schematic diagram of a network architecture of another data sending method according to an embodiment of this application. Refer to FIG. 3B. The network architecture includes transmission points in a coordinated set and an electronic device. The coordinated set includes a serving transmission point and at least one coordinated transmission point. In FIG. 3B, a first transmission point is, for example, a serving transmission point or a coordinated transmission point, and a second transmission point is, for example, a coordinated transmission point or a serving transmission point. When the first transmission point is the serving transmission point, the first transmission point and a third transmission point are the same transmission point. Similarly, when the second transmission point is the serving transmission point, the second transmission point and the third transmission point are the same transmission point. The third transmission point is configured to: determine the first transmission point from the coordinated set, determine a second downlink sending weight of the second transmission point based on a first downlink sending weight of the first transmission point, and send the second downlink sending weight to the second transmission point, so that the second transmission point sends a data stream to the electronic device by using the second downlink sending weight. The network architecture is applicable to a scenario in which transmission points are controlled in a distributed manner.

In FIG. 3A and FIG. 3B, the transmission point (TP) is also referred to as a transmission reception point (TRP), a remote radio unit (RRU), or the like, and includes but is not limited to a base transceiver station (BTS) in a global system for mobile communications (GSM), an NB (NodeB) in a wideband code division multiple access (WCDMA) system, an evolved NodeB (eNB), a relay station, a vehicle-mounted device, a wearable device in a long term evolution (LTE) system, an access network device in a 5th generation (5G) communication system, an access network device in a future evolved public land mobile network (PLMN) network, and the like.

The electronic device is a mobile station, an access terminal, a subscriber unit (e.g., subscriber circuit), a subscriber station, a mobile station, a remote station, a remote terminal, a mobile device, a user terminal, a terminal, a wireless communications device, a user agent, a user apparatus, or the like. The electronic device is, for example, a cellular phone, a cordless phone, a session initiation protocol (SIP) phone, a wireless local loop (WLL) station, a handheld device having a wireless communication function, a computing device or another processing device connected to a wireless modem, a vehicle-mounted device, a wearable device, a mobile station in a future 5G network, a terminal device in a future evolved PLMN network, or the like. In addition, the electronic device may alternatively include a relay or another device that can communicate with an access network device.

It should be noted that, although FIG. 3A shows only two transmission points and one electronic device, and FIG. 3B shows only three transmission points and one electronic device, some embodiments of this application is not limited thereto. In another feasible implementation, there are a plurality of transmission points and a plurality of electronic devices in a coordinated set. The transmission points in the coordinated set include a serving transmission point and a coordinated transmission point, and the serving transmission point is a transmission point accessed by the electronic device.

Figure 4:
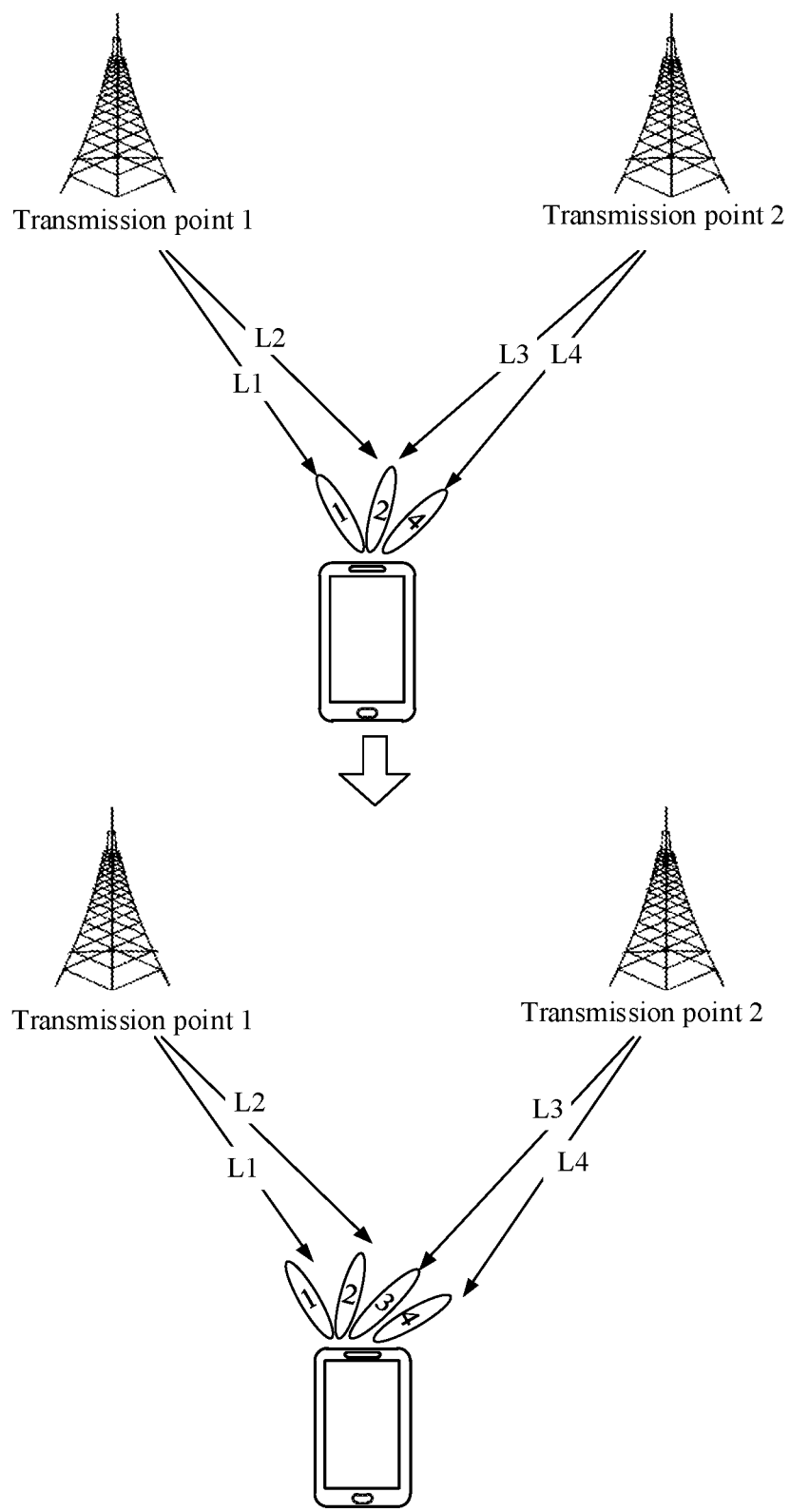
FIG. 4 is a schematic diagram of orthogonal of receiving subspaces in a data sending method according to an embodiment of this application.

FIG. 4 is a schematic diagram of orthogonality of receiving subspaces in a data sending method according to an embodiment of this application. Refer to FIG. 4. Different ellipses in the figure represent different receiving subspaces. A transmission point 1 sends a data stream 1 and a data stream 2 to the electronic device, and a transmission point 2 sends a data stream 3 and a data stream 4 to the electronic device. Before orthogonalization, the electronic device receives the data stream 1 in a receiving subspace 1, receives the data stream 2 and the data stream 3 in a receiving subspace 2, and receives the data stream 4 in a receiving subspace 4. It is clear that, the data stream 2 and the data stream 3 are received by the electronic device in the same receiving subspace, and interference is caused.

After orthogonalization is performed according to the method provided in embodiments of this application, the electronic device receives the data stream 1 in the receiving subspace 1, receives the data stream 2 in the receiving subspace 2, receives the data stream 3 in a receiving subspace 3, and receives the data stream 4 in the receiving subspace 4. Because the receiving subspace 1, the receiving subspace 2, the receiving subspace 3, and the receiving subspace 4 are orthogonal to each other, in this case, data streams sent by the transmission point 1 and the transmission point 2 do not interfere with each other. Alternatively, the receiving subspace 1, the receiving subspace 2, the receiving subspace 3, and the receiving subspace 4 are approximately orthogonal to each other, and in this case, there is little interference between data streams sent by the transmission point 1 and the transmission point 2. The transmission point 1 and the transmission point 2 are different transmission points in a same coordinated set.

The following describes symbols in the data sending method provided in embodiments of this application.

$H_{i,j}$ represents a channel from $TRP_i$ to $UE_j$. When a coordinated set includes two transmission points, the electronic device is user equipment (UE), and the two transmission points cooperatively serve same UE, i∈{1,2}, and j=1.

$H_{1,1}$ is denoted as $H_1$, and represents a first channel matrix, namely, a channel matrix between a first transmission point and the UE.

$H_{2,1}$ is denoted as $H_2$, and represents a second channel matrix, namely, a channel matrix between a second transmission point and the UE.

$W_{i,j}$ represents a downlink sending weight used when $TRP_i$ sends a data stream to $UE_j$.

$W_{1,1}$ is denoted as $W_1$, and represents a first downlink sending weight of the first transmission point. The first downlink sending weight is a matrix, and different columns in the matrix represent downlink sending weights of different data streams of the first transmission point.

$W_{2,1}$ is denoted as $W_2$, and represents a second downlink sending weight of the second transmission point. The second downlink sending weight is a matrix, and different columns in the matrix represent downlink sending weights of different data streams of the second transmission point.

$V_{i,j}$ represents a right singular matrix obtained by performing singular value decomposition (SVD) decomposition on $H_{i,j}$.

$V_{1,1}$ is denoted as $V_1$, and represents a right singular matrix obtained by performing SVD decomposition on $H_1$.

$V_{2,1}$ is denoted as $V_2$, and represents a right singular matrix obtained by performing SVD decomposition on $H_2$.

$U_{i,j}$ represents a left singular matrix obtained by performing SVD decomposition on $H_{i,j}$.

$U_{1,1}$ is denoted as $U_1$, and represents a left singular matrix obtained by performing SVD decomposition on $H_1$.

$U_{2,1}$ is denoted as $U_2$, and represents a left singular matrix obtained by performing SVD decomposition on $H_2$.

$H_1 W_1$ represents an equivalent channel of a first channel. After weighting a data stream based on the first downlink sending weight $W_1$, the first transmission point sends the weighted data stream to the electronic device through the first channel. The equivalent channel of the first channel is $H_1 W_1$.

$H_2 W_2$ represents an equivalent channel of a second channel. After weighting a data stream based on the second downlink sending weight $W_2$, the second transmission point sends the weighted data stream to the electronic device through the second channel. The equivalent channel of the second channel is $H_2 W_2$.

The following describes in detail the data sending method according to embodiments of this application based on FIG. 3A, FIG. 4, and the descriptions of the symbols. For example, refer to FIG. 5.

Figure 5:
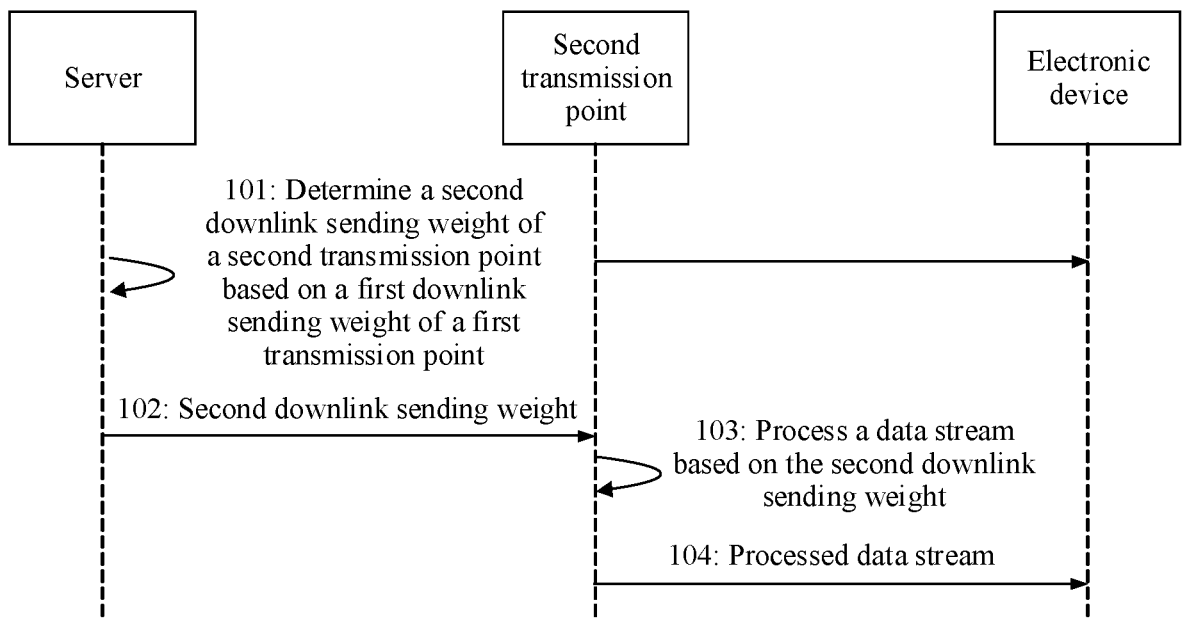
FIG. 5 is a flowchart of a data sending method according to an embodiment of this application.

FIG. 5 is a flowchart of a data sending method according to an embodiment of this application. This embodiment is described from a perspective of interaction between a server and transmission points. This embodiment includes the following steps.

101: The server determines a second downlink sending weight of a second transmission point based on a first downlink sending weight of a first transmission point.

For example, the first transmission point and the second transmission point belong to a same coordinated set, and each transmission point in the coordinated set serves an electronic device based on NCJT. The first transmission point is, for example, a transmission point randomly selected by the server from the coordinated set, or a transmission point with a lowest receive power in the coordinated set; the first transmission point is any one of transmission points whose receive power is lower than a preset threshold in the coordinated set; or the first transmission point is a predefined transmission point, where for example, a transmission point whose identifier is "baseline" in the coordinated set is predefined as the first transmission point. The second transmission point is, for example, any transmission point other than the first transmission point in the coordinated set, or a transmission point whose receive power is higher only than that of the first transmission point in the coordinated set. After determining the first transmission point from the coordinated set, the server determines the first downlink sending weight by using a first channel matrix of a first channel. The first channel is a channel between the first transmission point and the electronic device. Then, the server determines the second downlink sending weight of the second transmission point based on the first downlink sending weight of the first transmission point, so that a first receiving subspace and a second receiving subspace are completely orthogonal. The first downlink sending weight corresponds to the first receiving subspace, and the second downlink sending weight corresponds to the second receiving subspace. In addition, because orthogonalization on the second transmission point causes a large beam gain loss of the second transmission point, to avoid an excessively large beam gain loss of the second transmission point, when performing orthogonalization on the second transmission point, the server considers both the beam gain loss and orthogonalization of the receiving subspaces. In this case, the first receiving subspace and the second receiving subspace of the second transmission point are approximately orthogonal.

It can be learned that, for any second transmission point in the coordinated set, the server can determine the second downlink sending weight of the second transmission point based on the first downlink sending weight, a second channel matrix, and the like. The second channel matrix is a channel matrix of a second channel between the second transmission point and the electronic device.

102: The server sends the second downlink sending weight to the second transmission point.

103: The second transmission point processes a data stream based on the second downlink sending weight.

For example, the second downlink sending weight is a matrix, and each column in the matrix is a downlink sending weight of a data stream. When sending a data stream, the second transmission point determines a downlink sending weight corresponding to the data stream from the matrix, and weights the data stream by using the weight.

104: The second transmission point sends the processed data stream to the electronic device.

For example, the second transmission point sends the weighted data stream to the electronic device.

According to the data sending method provided in some embodiments, a server determines a first transmission point from a coordinated set, and determines a first downlink sending weight of the first transmission point. Then, for any second transmission point in the coordinated set, the server determines a second downlink sending weight of the second transmission point based on the first downlink sending weight, and sends the second downlink sending weight to the second transmission point. The second downlink sending weight is a matrix, and different columns in the matrix represent downlink sending weights of different data streams. When sending a data stream to an electronic device, the second transmission point determines a downlink sending weight corresponding to the data stream from the matrix, weights the data stream, and sends the weighted data stream to the electronic device. In this process, the server determines the second downlink sending weight of the second transmission point based on the first downlink sending weight of the first transmission point, so that when the electronic device receives data streams sent by transmission points in the coordinated set, receiving directions of different data streams are orthogonal or approximately orthogonal, thereby resolving a problem that interference between data streams of different transmission points is excessively large when the electronic device receives the data streams, and achieving an objective of correctly receiving data by the electronic device.

It should be noted that, although in the embodiment shown in FIG. 5, this application is described in detail through interaction between the server and the second transmission point as an example, this is not limited to some embodiments of this application. In another feasible implementation, for example, when the architecture shown in FIG. 3B is used, the actions performed by the server in FIG. 5 may be performed by a serving transmission point in the coordinated set. In the following, unless otherwise specified, any action performed by the server can be performed by the serving transmission point instead.

In the foregoing embodiments, before determining the second downlink sending weight of the second transmission point based on the first downlink sending weight of the first transmission point, the server further receives the first channel matrix from the first transmission point and the second channel matrix from the second transmission point, where the first channel matrix is a channel matrix of the first channel between the first transmission point and the electronic device, and the second channel matrix is a channel matrix of the second channel between the second transmission point and the electronic device.

For example, when the server determines the downlink sending weight of each transmission point, the server needs to learn of the downlink sending weight of each transmission point in the coordinated set. For example, the server sends a request message to each transmission point, to request the transmission point to report a channel matrix. After receiving the request message, the transmission point reports the channel matrix to the server. For another example, each transmission point in the coordinated set periodically reports the channel matrix.

In this solution, the transmission point actively or passively reports the channel matrix of the channel between the transmission point and the electronic device to the server, and the server determines the downlink sending weight of each transmission point based on channel matrices, so that the channel matrices of different transmission points are not independent. Therefore, when the electronic device receives data streams sent by transmission points in the coordinated set, receiving directions of different data streams are orthogonal or approximately orthogonal, thereby resolving a problem that interference between data streams of different transmission points is excessively large when the electronic device receives the data streams, and achieving an objective of correctly receiving data by the electronic device.

In the foregoing embodiments, the server determines the second downlink sending weight of the second transmission point based on the first downlink sending weight of the first transmission point, so that when the electronic device receives data streams sent by transmission points in the coordinated set, receiving directions of different data streams are orthogonal or approximately orthogonal. Therefore, a process in which the server determines the second downlink sending weight of the second transmission point based on the first downlink sending weight of the first transmission point is also referred to as an orthogonalization process.

In the foregoing embodiments, before determining the second downlink sending weight of the second transmission point based on the first downlink sending weight of the first transmission point, the server further determines the first transmission point from a plurality of transmission points included in the coordinated set.

For example, one coordinated set includes a plurality of transmission points, and the plurality of transmission points include one serving transmission point and a plurality of coordinated transmission points. The server determines the first transmission point from the transmission points. The first transmission point is, for example, a transmission point with a worst signal receive power in the coordinated set. For example, when a signal receive power of the serving transmission point in the coordinated set is the worst, the server uses the serving transmission point as the first transmission point. For another example, when a signal receive power of a coordinated transmission point in the coordinated set is the worst, the server uses the coordinated transmission point as the first transmission point.

After orthogonalization, the second transmission point no longer sends data streams in a largest sending space. Consequently, the orthogonalization causes an energy loss. If signal quality is poor, signal quality after orthogonalization is worse. However, in new radio (NR) Release 15, a same codeword corresponds to a plurality of streams, streams of the transmission points in the coordinated set correspond to a same codeword, and demodulation performance of the codeword is limited by performance of a worst data stream in the data streams. In other words, if orthogonalization is performed on a transmission point with the worst receive power, impact on demodulation performance is greatest.

Therefore, in the orthogonalization process, the server selects a baseline transmission point (e.g., baseline RRU) from the coordinated set, and the baseline transmission point is the first transmission point. Then, the server performs SVD on the first channel matrix between the first transmission point and the electronic device, to obtain the first downlink sending weight of the first transmission point, and determines a receiving subspace in which the electronic device receives the data stream of the first transmission point. Then, the server determines the second downlink sending weight of the second transmission point with reference to the receiving subspace determined based on the first downlink sending weight. To ensure that a receiving subspace corresponding to the second transmission point is orthogonal to or approximately orthogonal to the receiving subspace corresponding to the first transmission point, the second transmission point cannot send data in an optimal sending subspace, thereby causing a beam gain loss. Considering that in NR Release 15, modulation and coding schemes (MCSs) of the plurality of data streams corresponding to the same codeword are the same, a signal to interference plus noise ratio (SINR) of the worst stream should be maximized.

In this solution, when the first transmission point is selected based on a path loss, a rank number, and the like, a transmission point with a low receive power is preferentially selected as the first transmission point, and orthogonalization is performed on the second transmission point with a high receive power by using the first transmission point as a reference, to avoid performing orthogonalization on a first transmission point with a low receive power, thereby avoiding an increase in a beam gain loss of the first transmission point and improving codeword demodulation performance.

It should be noted that, although the server uses the transmission point with the worst receive power in the coordinated set as the first transmission point, this is not limited to some embodiments of this application. For example, the server randomly extracts a transmission point from the coordinated set as the first transmission point. For another example, the server determines the receive power of each transmission point to obtain the receive power of each transmission point. Then, the server determines receive powers lower than a preset threshold from the receive powers, and selects a first transmission point from transmission points whose receive powers are lower than the preset threshold.

The following uses an example in which the coordinated set includes only two transmission points to describe in detail the orthogonalization process in the foregoing embodiment, that is, describe in detail how the server determines the second downlink sending weight of the second transmission point based on the first downlink sending weight of the first transmission point.

In a first implementation, when determining the second downlink sending weight of the second transmission point based on the first downlink sending weight of the first transmission point, after determining the first transmission point from the coordinated set, the server determines the first downlink sending weight of the first transmission point based on the first channel matrix of the first channel between the first transmission point and the electronic device, where the first downlink sending weight is a largest sending subspace of the first channel matrix. Then, the server determines a zero-receiving subspace of the first channel based on the first downlink sending weight, and determines the second downlink sending weight based on the zero-receiving subspace of the first channel. The first channel is a channel between the first transmission point and the electronic device.

For example, this implementation includes the following steps.

Step 1: The server performs SVD decomposition on the first channel matrix of the first channel.

In a process of determining the first downlink sending weight of the first transmission point, the server performs SVD decomposition on the first channel matrix $H_1$ between the first transmission point and the electronic device. The SVD decomposition process is shown in the following Formula (1):

$$H_1 = U_1 D_1 V_1^H \qquad \text{Formula (1)}$$

$U_1$ represents a left singular matrix obtained by performing SVD decomposition on $H_1$, $D_1$ represents a singular value matrix obtained by performing SVD decomposition on $H_1$, $V_1$ represents a right singular matrix obtained by performing SVD decomposition on $H_1$, and $V_1^H$ represents a conjugate transposed matrix of $V_1$.

Step 2: After performing SVD on $H_1$, the server determines a largest sending subspace of the first transmission point based on an SVD decomposition result, and uses the largest sending subspace as the first downlink sending weight of the first transmission point, as shown in the following Formula (2):

$$W_1 = V_1(:,1:r_1) \qquad \text{Formula (2)}$$

In Formula (2), $r_1$ represents a quantity of data streams to be sent by the first transmission point, and $V_1(:,1:r_1)$ represents that the first column to the $r_1^{th}$ column are selected from the right singular matrix $V_1$.

The first downlink sending weight $W_1$ of the first transmission point may be determined according to the foregoing Formula (1) and Formula (2).

Step 3: After determining the first downlink sending weight, the server determines the zero-receiving subspace of the first channel.

For example, the zero-receiving subspace of the first channel $H_1$ is a zero-receiving subspace of an equivalent channel $H_1 W_1$ of the first channel $H_1$. The zero receiving subspace of $H_1 W_1$ is $U_1(:, r_1+1:r_1+r_2)$, $r_2$ represents a quantity of data streams to be sent by the second transmission point, and $U_1(:, r_1+1:r_1+r_2)$ represents that the $r_1+1^{th}$ column to the $r_1+r_2^{th}$ column are selected from the left singular matrix $U_1$.

Then, the server may determine the second downlink sending weight based on the zero-receiving subspace of the first channel.

For example, the server determines the second downlink sending weight based on the zero-receiving subspace of the first channel and a second channel matrix of a second channel, where the second channel is a channel between the second transmission point and the electronic device.

The server maps a precoded equivalent channel $H_2 W_2$ of the second transmission point to the zero-receiving subspace $U_1(:, r_1+1:r_1+r_2)$ of $H_1 W_1$, to obtain the following Formula (3):

$$H_2 W_2 = U_1(:,r_1+1:r_1+r_2) = \tilde{U}_1 \qquad \text{Formula (3)}$$

The second downlink sending weight of the second transmission point is shown in the following Formula (4):

$$W_2 = H_2^H \{H_2 H_2^H + \sigma^2 I\}^{-1} \tilde{U}_1 \qquad \text{Formula (4)}$$

$H_2^H$ represents a conjugate transposed matrix of $H_2$, $\sigma^2$ represents a scrambling factor, I represents a unit matrix, and elements on a main diagonal of the unit matrix are 1, and elements at other positions are 0.

In the foregoing process of determining the second downlink sending weight, mapping the equivalent channel $H_2 W_2$ to the zero-receiving subspace of $H_1 W_1$ means that: when the second transmission point weights a data stream by using the second downlink sending weight, and after the weighted data stream arrives at the electronic device through the second channel, a receiving subspace of the electronic device is $U_1(:, r_1+1:r_1+r_2)$.

In this solution, the second downlink sending weight of the second transmission point is determined based on the first downlink sending weight of the first transmission point, so that when the electronic device receives data streams of the first transmission point and data streams of the second transmission point, receiving directions of the data streams are as orthogonal as possible, to improve data receiving accuracy.

For another example, when determining the second downlink sending weight based on the zero-receiving subspace of the first channel, the server performs the following steps.

Step 4: Determine a largest receiving subspace of a second channel based on a second channel matrix of the second channel between the second transmission point and the electronic device.

For example, the server performs SVD decomposition on the second channel matrix $H_2$ to obtain a largest receiving subspace $U_2(:,1:r_2)$ of the second channel, $r_2$ represents a quantity of data streams to be sent by the second transmission point, and $U_2(:,1:r_2)$ represents that the first column to the $r_2^{th}$ column are selected from the left singular matrix $U_2$ obtained by performing SVD decomposition on $H_2$.

Step 5: Project the largest receiving subspace of the second channel to the zero-receiving subspace of the first channel, to obtain a first projection matrix.

For example, the server projects the largest receiving subspace $U_2(:,1:r_2)$ of the second channel to the zero-receiving subspace $U_1(:, r_1+1:r_1+r_2)$ of the first channel, to obtain the first projection matrix, to ensure the first projection matrix $U_1(:, r_1+1:r_1+r_2)$ and the largest receiving subspace $U_1(:,1:r_1)$ of the first transmission point are orthogonal. The first projection matrix is shown in the following Formula (5):

$$U_2^{Proj} = (U_1(:, r_1+1:r_i+r_2)U_1^H(:, r_1+1:r_1+r_2))U_2(:, 1:r_2)$$ Formula (5)

Step 6: Perform Schmidt orthogonalization on the first projection matrix to obtain a first orthogonal matrix.

For example, to ensure orthogonality between data streams delivered by the second transmission point, the server performs Schmitt orthogonalization on a second projection matrix $U_2^{Proj}$, to obtain the first orthogonal matrix $\tilde{U}_2$. When $r_2=2$, the first column in the first orthogonal matrix $\tilde{U}_2$ is $\tilde{U}_2(:,1)=U_2^{Proj}(:1)$, and the second column in the first orthogonal matrix is shown in the following Formula (6):

$$\tilde{U}_2(:,2) = U_2^{Proj}(:,2) - U_2^{Proj}(:,1)U_2^{Proj}(:,1)^H)U_2^{Proj}(:,2)$$ Formula (6)

Step 7: Determine the second downlink sending weight based on the first orthogonal matrix and the second channel matrix of the second channel.

For example, the server maps a precoded equivalent channel $H_2W_2$ of the second transmission point to the first orthogonal matrix $\tilde{U}_2$, and the second downlink sending weight of the second transmission point is shown in the following Formula (7):

$$W_2 = H_2^H(H_2H_2^H + \sigma^2 I)^{-1}\tilde{U}_2$$ Formula (7)

According to this solution, orthogonality between streams of the second transmission point is ensured, and when the electronic device receives data streams sent by transmission points in the coordinated set, receiving directions of different data streams are orthogonal or approximately orthogonal, thereby resolving a problem that interference between data streams of different transmission points is excessively large when the electronic device receives the data streams, and achieving an objective of correctly receiving data by the electronic device.

In a second implementation, when determining the second downlink sending weight of the second transmission point based on the first downlink sending weight of the first transmission point, the server determines a largest receiving subspace of a second channel based on a second channel matrix of the second channel between the second transmission point and the electronic device. Then, the server determines a second orthogonal matrix based on subspaces of the largest receiving subspace of the second channel, a largest receiving subspace of a first channel matrix, and the largest receiving subspace of the second channel matrix. Finally, the server determines the second downlink sending weight based on the second channel matrix and the second orthogonal matrix.

For example, this implementation includes the following steps.

Step 1: The server performs SVD decomposition on the first channel matrix of the first channel.

In a process of determining the first downlink sending weight of the first transmission point, the server performs SVD decomposition on the first channel matrix $H_1$ between the first transmission point and the electronic device. The SVD decomposition process is shown in the following Formula (1):

$$H_1 = U_1 D_1 V_1^H$$ Formula (1)

$U_1$ represents a left singular matrix obtained by performing SVD decomposition on $H_1$, $D_1$ represents a singular value matrix obtained by performing SVD decomposition on $H_1$, $V_1$ represents a right singular matrix obtained by performing SVD decomposition on $H_1$, and $V_1^H$ represents a conjugate transposed matrix of $V_1$.

Step 2: After performing SVD on $H_1$, the server determines a largest sending subspace of the first transmission point based on an SVD decomposition result, and uses the largest sending subspace as the first downlink sending weight of the first transmission point, as shown in the following Formula (2):

$$W_1 = V_1(:,1:r_1)$$ Formula (2)

In Formula (2), $r_1$ represents a quantity of data streams to be sent by the first transmission point, and $V_1(:,1:r_1)$ represents that the first column to the $r_1^{th}$ column are selected from the right singular matrix $V_1$.

Step 3: The server performs SVD decomposition on the second channel matrix $H_2$ of the second channel, to obtain a largest receiving subspace $U_2(:,1:r_2)$ of the second channel.

Step 4: The server projects subspaces of the largest receiving subspace $U_2(:,1:r_2)$ of the second channel to the largest receiving subspace $U_1(:,1:r_1)$ of the first channel, and orthogonalized subspaces in the largest receive subspace $U_2(:,1:r_2)$ of the second channel, and takes a vertical component, so that the subspaces are orthogonal to each other. An iteration process is as follows: Let $U_f=[U_1(:,1:r_2)$ $\overline{U}_2^{Proj}(:, 1:i-1)]$, project $U_2(:,1:r_2)$ to $U_f$, and perform orthogonalization to obtain a second projection matrix. The orthogonalization process is shown in the following Formula (8):

$$\overline{U}_2^{Proj}(:,i) = U_2(:,i) - (U_f U_f^H)U_2(:,i)$$ Formula (8)

For example, subspaces of the largest receiving subspace $U_2(:,1:r_2)$ of the second channel are: $U_2(:,1), U_2(:,2), \ldots,$ and $U_2(:,r_2)$. $U_f$ represents a subspace to be projected to, including subspaces that have been orthogonalized in $U_1(:,1:r_1)$ and $U_2(:,1:r_2)$.

In the foregoing iteration process, the subspaces $U_2(:,i)$ $(i=1, \ldots, r_2)$ of $U_2(:,1:r_2)$ are successively selected, a selected subspace is projected to the subspaces that have been orthogonalized in $U_1(:,1:r_1)$ and $U_2(:,1:r_2)$. Then, a vertical component is taken, to obtain orthogonalized $U_2(:,i)$ which is denoted as $\overline{U}_2^{Proj}(:,1)$.

For example, in the first iteration process, i=1, $U_2(:,1)$ is extracted from $U_2(:,1:r_2)$, and $U_2(:,1)$ is projected to $U_1(:,1:r_1)$. In this case, there is no subspace that has been orthogonalized in $U_2(:,1:r_2)$. Then, a vertical component is taken, to obtain orthogonalized $U_2(:,1)$ which is denoted as $\overline{U}_2^{Proj}(:,1)$.

For another example, in the second iteration process, i=2, $U_2(:,2)$ is extracted from $U_2(:,1:r_2)$, and $U_2(:,2)$ is projected to subspaces of $U_1(:,1:r_1)$ and $\overline{U}_2^{Proj}(:,1)$. Then, a vertical component is taken, to obtain orthogonalized $U_2(:,2)$ which is denoted as $\overline{U}_2^{Proj}(:,2)$.

The rest may be deduced by analogy. To be specific, a subspace processed in each iteration process is orthogonal to each previous subspace.

Step 5: After completing orthogonalization on weights of the subspaces of $U_2(:,1:r_2)$, the server maps a precoded equivalent channel $H_2W_2$ of the second transmission point to the second orthogonal matrix $\overline{U}_2^{Proj}$, and the second downlink sending weight of the second transmission point is shown in the following Formula (9):

$$W_2 = H_2^H (H_2 H_2^H + \sigma^2 I)^{-1} \overline{U}_2^{Proj} \quad \text{Formula (9)}$$

According to this solution, the downlink sending weight of the second transmission point is processed based on the downlink sending weight of the first transmission point, so that when the electronic device receives the data stream sent by the first transmission point and the data stream sent by the second transmission point, receiving directions of different data streams are orthogonal or approximately orthogonal, thereby resolving a problem that interference between data streams of different transmission points is excessively large when the electronic device receives the data streams, and achieving an objective of correctly receiving data by the electronic device.

In a third implementation, when determining the second downlink sending weight of the second transmission point based on the first downlink sending weight of the first transmission point, the server first determines a cross covariance matrix of a first channel and a second channel based on a first channel matrix of the first channel between the first transmission point and the electronic device and a second channel matrix of the second channel between the second transmission point and the electronic device. Then, the server determines a product matrix based on the cross covariance matrix and the first downlink sending weight, and further determines the second downlink sending weight based on the product matrix. The product matrix indicates a product of a conjugate transposed matrix of the first downlink sending weight and the cross covariance matrix.

For example, when the first transmission point and the second transmission point send data based on FeCoMP, for the electronic device, a receive channel model of the electronic device is shown in the following formula (10):

$$Y = [H_1 W_1 \quad H_2 W_2] \begin{bmatrix} s_1 \\ s_2 \end{bmatrix} + n \quad \text{Formula (10)}$$

Y represents the receive channel model of the electronic device, $s_1$ represents a data stream sent by the first transmission point, $s_2$ represents a data stream sent by the second transmission point, and n represents noise. For example, a receiver on the electronic device is a maximum ratio combining (MRC) receiver. Formula (11) is obtained according to Formula (10):

$$[H_1 W_1 \quad H_2 W_2]^H [H_1 W_1 \quad H_2 W_2] = \quad \text{Formula (11)}$$
$$\begin{bmatrix} W_1^H R_1 W_1 & W_1^H R_{cross} W_2 \\ W_2^H R_{cross}^H W_1 & W_2^H R_2 W_2 \end{bmatrix}$$

$R_{cross} = H_1^H H_2$, $R_{cross}$ represents a cross covariance matrix of $H_1$ and $H_2$.

Based on Formula (11), an optimal design principle is shown in Formula (12):

$$\max_{W_1, W_2 \in C} \left( \frac{\|H_1 W_1\|^2 + \|H_2 W_2\|^2}{\|W_1^H R_{cross} W_2\| + \sigma^2 I} \right) \quad \text{Formula (12)}$$

C represents a vector space of a transmit antenna dimension of the first transmission point and the second transmission point.

A function $F(W_1, W_2)$ about the first downlink sending weight $W_1$ and the second downlink sending weight $W_2$ can be obtained according to Formula (12), and the function is shown in the following Formula (13):

$$F(W_1, W_2) = \frac{W_1^H R_1 W_1 + W_2^H R_2 W_2}{\|W_1^H R_{cross} W_2\| + \sigma^2} \quad \text{Formula (13)}$$

When $F(W_1, W_2)$ in Formula (13) is set to a maximum value, Formula (12) can be obtained. In addition, because the first downlink sending weight $W1 = V1(:,1:r_1)$ is a known quantity. Formula (13) may be simplified into Formula (14):

$$F(W_2) = \frac{W_2^H R_2 W_2}{\|W_1^H R_{cross} W_2\| + \sigma^2} \quad \text{Formula (14)}$$

Formula (14) indicates that $W_2$ that maximizes a value of the function $F(W_2)$ is the largest is the optimal $W_2$.

Based on the above, the feasible implementation includes the following steps.

Step 1: The server performs SVD decomposition on the first channel matrix of the first channel.

In a process of determining the first downlink sending weight of the first transmission point, the server performs SVD decomposition on the first channel matrix $H_1$ between the first transmission point and the electronic device. The SVD decomposition process is shown in the following Formula (1):

$$H_1 = U_1 D_1 V_1^H \quad \text{Formula (1)}$$

$U_1$ represents a left singular matrix obtained by performing SVD decomposition on $H_1$, $D_1$ represents a singular value matrix obtained by performing SVD decomposition on $H_1$, $V_1$ represents a right singular matrix obtained by performing SVD decomposition on $H_1$, and $V_1^H$ represents a conjugate transposed matrix of $V_1$.

Step 2: After performing SVD on $H_1$, the server determines a largest sending subspace of the first transmission point based on an SVD decomposition result, and uses the largest sending subspace as the first downlink sending weight of the first transmission point, as shown in the following Formula (2):

$$W_1 = V_1(:,1:r_1) \quad \text{Formula (2)}$$

In Formula (2), $r_1$ represents a quantity of data streams to be sent by the first transmission point, and $V_1(:,1:r_1)$ represents that the first column to the $r_1^{th}$ column are selected from the right singular matrix $V_1$.

Step 3: The server determines a cross covariance matrix of the first channel and the second channel.

For example, the cross covariance matrix of the first channel and the second channel is shown in the following Formula (15):

$$R_{cross} = \alpha_i \cdot H_{1,i}^H H_{2,i} \quad \text{Formula (15)}$$

In Formula (15), i represents a receive antenna index of the electronic device. Because there are phase differences between different transmission points on receive antennas of the electronic device, in comparison with $R_{cross}=H_1{}^H H_2$, a phase alignment coefficient $\alpha_i$ is introduced in Formula (15), and is used to align a phase between the first transmission point and the second transmission point.

Step 4: The server determines a product matrix based on the cross covariance matrix and the first downlink sending weight.

For example, a product matrix $W_1{}^H R_{cross}$ may be obtained according to Formula (15), where the product matrix $W_1{}^H R_{cross}$ is a product of a conjugate transposed matrix $W_1{}^H$ of the first downlink sending weight $W_1$ and a cross covariance matrix $R_{cross}$ shown in Formula (15). Because in Formula (15). $H_{1,i}{}^H H_{2,i}$ is the cross covariance matrix, phase alignment needs to be performed first during superposition. $\alpha_i$ is a phase alignment coefficient. Let $A_i=H_{1,i}{}^H H_{2,i}$, and $\alpha_i=A_i(1,1)/|A_i(1,1)|$.

Step 5: Determine the second downlink sending weight based on the product matrix.

The following sub-manner 1 and sub-manner 2 are two optional manners in which the server performs step 5.

Sub-manner 1: The server determines a zero-sending subspace of the product matrix, and projects the second channel matrix to the zero-sending subspace of the product matrix, to obtain a second projection matrix. Then, the server determines a covariance matrix of the second projection matrix; and performs SVD decomposition on the covariance matrix of the second projection matrix to determine the second downlink sending weight, where the second downlink sending weight is a largest sending space of the covariance matrix of the second projection matrix.

In this sub-manner, the server calculates the zero-sending subspace of the product matrix $W_1{}^H R_{cross}$. To be specific, the server performs SVD decomposition on the product matrix $W_1{}^H R_{cross}$ to obtain a right singular value matrix $V_c$. Then, the server selects the $r_1{}^{th}$ column and the columns after the $r_1{}^{th}$ column from the right singular value matrix $V_c$, to obtain the zero-sending subspace $\tilde{V}_c = V_c(:, r_1+1:\text{end})$ of the product matrix $W_1{}^H R_{cross}$.

After determining the zero-sending subspace $\tilde{V}_c = V_c(:, r_1+1:\text{end})$ of the product matrix $W_1{}^H R_{cross}$, the server projects the second channel matrix $H_2$ to the zero-sending subspace $\tilde{V}_c = V_c(:, r_1+1:\text{end})$ to obtain the second projection matrix $H_{2\,proj}$. A purpose of the projection is to maximize Formula (14), in other words, to minimize the denominator in Formula (14). The second projection matrix $H_{2\,proj=(\tilde{V}_c\tilde{V}_c{}^H)H_2}$. The server continues to determine a covariance matrix $\tilde{R}_2$ of the second projection matrix $H_{2\,proj=(\tilde{V}_c\tilde{V}_c{}^H)H_2}$ by using Formula (16):

$$\tilde{R}_2 = \left(\tilde{V}_c \tilde{V}_c^H\right) R_2 \left(\tilde{V}_c \tilde{V}_c^H\right) \quad \text{Formula (16)}$$

$R_2$ represents the covariance matrix of the second transmission point.

After determining the covariance matrix $\tilde{R}_2$, the server performs SVD decomposition on the covariance matrix $\tilde{R}_2$: $\tilde{R}_2 = \tilde{U}_2 \tilde{D}_2 \tilde{V}_2$. Then, the server uses a largest sending subspace of the covariance matrix $\tilde{R}_2$ as the second downlink transmit weight $W_2$, as shown in the following Formula (17):

$$W_2 = \tilde{V}_2(:, 1:r_2) \quad \text{Formula (17)}$$

According to this solution, the second downlink sending weight is obtained from a transmit antenna dimension, and an objective of flexibly determining the second downlink transmit weight is achieved.

Sub-manner 2: The server determines the second downlink sending weight based on the product matrix, the first downlink sending weight, a covariance matrix of the second channel matrix, and the cross covariance matrix of the first channel and the second channel.

For example, Formula (18) can be obtained based on the foregoing Formula (14):

$$F(W_2) = \max\left(\frac{W_2^H R_2 W_2}{\left\|W_1^H R_{cross} W_2\right\|^2 + \sigma^2}\right) = \quad \text{Formula (18)}$$

$$\max\left(\frac{W_2^H R_2 W_2}{W_2^H \left(R_{cross}^H W_1 W_1^H R_{cross}\right) W_2 + \sigma^2}\right)$$

In this case. Formula (18) meets a form of generalized Rayleigh entropy. Therefore, Formula (19) can be obtained by simplifying Formula (18) by using a property of Rayleigh entropy:

$$W_{2,Opt} = \text{eigvector}((R_{cross}{}^H W_1 W_1{}^H R_{cross}+\sigma^2)^{-1} R_2) \quad \text{Formula (19)}$$

$W_{2,Opt}$ is equivalent to the second downlink sending weight $W_2$, and eigvector represents obtaining an eigenvector of $((R_{cross}{}^H W_1 W_1{}^H R_{cross}+\sigma^2)^{-1} R_2)$.

The sub-manner 2 is an enhancement of the sub-manner 1. The second downlink sending weight $W_2$ obtained in the sub-manner 2 is better than that obtained in the sub-manner 1.

In a fourth implementation, when determining the second downlink sending weight of the second transmission point based on the first downlink sending weight of the first transmission point, the server projects the second channel matrix of the second channel between the second transmission point and the electronic device to a remaining receiving subspace of the first channel matrix, to obtain a third projection matrix. Then, the server determines the second downlink sending weight based on the third projection matrix. The remaining receiving subspace is a space other than a largest receiving subspace of the first channel matrix in receiving spaces of the first channel matrix.

For example, this implementation includes the following steps.

Step 1: The server performs SVD decomposition on the first channel matrix of the first channel.

In a process of determining the first downlink sending weight of the first transmission point, the server performs SVD decomposition on the first channel matrix $H_1$ between the first transmission point and the electronic device. The SVD decomposition process is shown in the following Formula (1):

$$H_1 = U_1 D_1 V_1{}^H \quad \text{Formula (1)}$$

$U_1$ represents a left singular matrix obtained by performing SVD decomposition on $H_1$, $D_1$ represents a singular value matrix obtained by performing SVD decomposition on $H_1$, $V_1$ represents a right singular matrix obtained by performing SVD decomposition on $H_1$, and $V_1{}^H$ represents a conjugate transposed matrix of $V_1$.

Step 2: After performing SVD on $H_1$, the server determines a largest sending subspace of the first transmission point based on an SVD decomposition result, and uses the largest sending subspace as the first downlink sending weight of the first transmission point, as shown in the following Formula (2):

$$W_1 = V_1(:,1:r_1) \quad \text{Formula (2)}$$

In Formula (2), $r_1$ represents a quantity of data streams to be sent by the first transmission point, and $V_1(:,1:r_1)$ represents that the first column to the $r_1^{th}$ column are selected from the right singular matrix $V_1$.

Step 3: The server projects the second channel matrix $H_2$ of the second channel between the second transmission point and the electronic device to a remaining receiving subspace $\tilde{U}_1$ in a receiving subspace $U_1$ of the first transmission point, to obtain a third projection matrix. The remaining receiving subspace $\tilde{U}_1$ is shown in the following Formula (20):

$$\tilde{U}_1 = U_1(:,r_1+1:end) \quad \text{Formula (20)}$$

It is assumed that the entire receiving space of the first transmission point is $U_1(:,1:end)$. When a quantity of data streams to be sent by the first transmission point is $r_1$, the largest receiving space of the first transmission point is $U_1(:,1:r_1)$, and the remaining receiving subspace of the first transmission point is $U_1(:, r_1+1:end)$.

The following formula (21) represents the third projection matrix $\hat{H}_2$ obtained by projecting the second channel matrix $H_2$ to the remaining receiving subspace $\tilde{U}_1$ in the receiving subspace $U_1$ of the first transmission point:

$$\hat{H}_2 = (\tilde{U}_1 \tilde{U}_1^H) H_2 \quad \text{Formula (21)}$$

$\tilde{U}_1^H$ represents a conjugate transpose matrix of $\tilde{U}_1$.

After obtaining the third projection matrix $\hat{H}_2$, the server may determine the second downlink sending weight in the following sub-manner 3 or sub-manner 4.

In the sub-manner 3, the server continues to perform step 4 and step 5 after step 3.

Step 4: The server performs SVD on the third projection matrix $\hat{H}_2$ to obtain a largest receiving subspace $\hat{U}_2(:,1:r_2)$ of the third projection matrix $\hat{H}_2$. The SVD decomposition process is shown in the following Formula (22):

$$\hat{H}_2 = \hat{U}_2 \hat{D}_2 \hat{V}_2^H \quad \text{Formula (22)}$$

Step 5: The server maps a precoded equivalent of the second transmission point to the largest receiving subspace $\hat{U}_2(:,1:r_2)$ of the third projection matrix $\hat{H}_2$, that is, $H_2 W_2 = \hat{U}_2(:,1:r_2)$. In this way, the second downlink sending weight of the second transmission point is shown in the following Formula (23):

$$W_2 = \frac{1}{\eta} \cdot H_2^H (H_2 H_2^H + \sigma^2 I)^{-1} \hat{U}_2(:, 1:r_2) \quad \text{Formula (23)}$$

$\eta$ represents a normalization coefficient of the weight value, and $$\eta = \left\| H_2^H (H_2 H_2^H + \sigma^2 I)^{-1} \hat{U}_2(:, 1:r_2) \right\|.$$

In addition, the server directly obtains the largest sending subspace of the third projection matrix $\hat{H}_2$ according to Formula (22), and uses the largest sending subspace $\hat{V}_2(:,1:r_2)$ of the third projection matrix $\hat{H}_2$ as the second downlink transmit weight $W_2$, as shown in the following Formula (24):

$$W_2 = \hat{V}_2(:,1:r_2) \quad \text{Formula (24)}$$

Figure 6A:
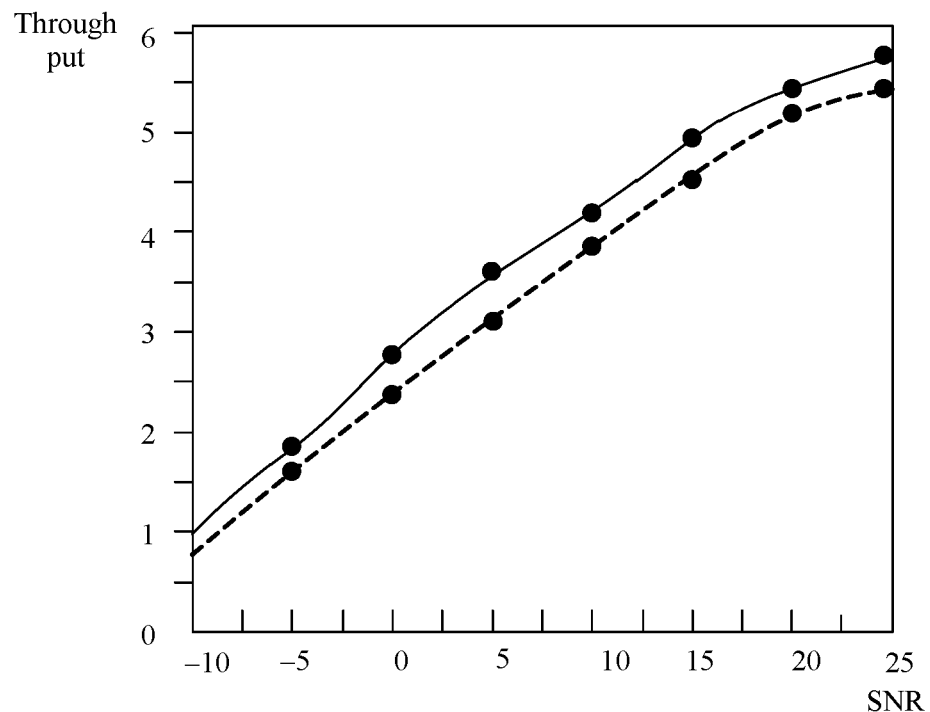
FIG. 6A is a schematic simulation diagram of a data sending method according to an embodiment of this application.

FIG. 6A is a schematic simulation diagram of a data sending method according to an embodiment of this application. Refer to FIG. 6A. A horizontal coordinate is a signal-to-noise ratio (SNR) of a transmission point, and a vertical coordinate is a throughput. When interference between transmission points in a coordinated set is excessively large, that is, directions in which a receive end receives data streams of the transmission points are not orthogonal, in comparison with a conventional solution, a throughput (as shown by a solid line in the figure) of the data sending method provided in some embodiments of this application is better than a throughput (as shown by a dashed line in the figure) of a conventional FeCoMP solution.

Figure 6B:
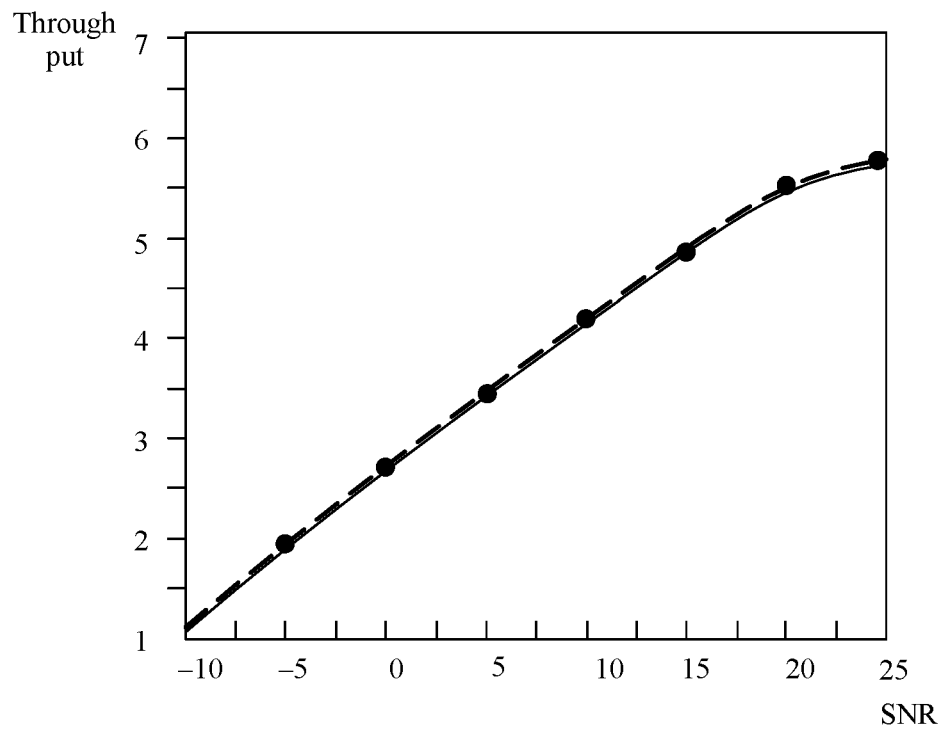
FIG. 6B is another schematic simulation diagram of a data sending method according to an embodiment of this application.

FIG. 6B is another schematic simulation diagram of a data sending method according to an embodiment of this application. Refer to FIG. 6B. A horizontal coordinate is a SNR of a transmission point, and a vertical coordinate is a throughput. When interference between transmission points in a coordinated set is weak, that is, directions in which a receive end receives data streams of the transmission points are orthogonal, in comparison with a conventional solution, a throughput (as shown by a solid line in the figure) of the data sending method provided in some embodiments of this application may be basically the same as a throughput of a conventional FeCoMP solution.

According to this method, the second downlink sending weight is obtained from a receive antenna dimension, and an objective of flexibly determining the second downlink transmit weight is achieved. In addition, in comparison with the manner of obtaining the second downlink sending weight from the transmit antenna dimension, this manner has lower calculation complexity.

"$H_2^H (H_2 H_2^H + \sigma^2 I)^{-1}$" exists in Formula (4) in the first implementation, Formula (7) and Formula (9) in the second implementation, and Formula (23) in the fourth implementation. When $H_2$ is non-full rank, distribution of a feature space is uneven, and a minimum eigenvalue is small, normalization of the transmit weight after inversion causes a serious beam gain loss problem. To solve this problem, $H_2^H (H_2 H_2^H + \sigma^2 I)^{-1}$ needs to be processed. $\sigma_2$ represents a scrambling factor for inversion. During the processing, the server determines a singular value matrix based on the second channel matrix of the second channel, and determines the scrambling factor based on the singular value matrix, a beam gain loss constraint condition, and an orthogonality constraint condition. The beam gain loss constraint condition indicates a condition that a gain loss meets in an inversion scrambling process, and the scrambling factor balances orthogonality between the gain loss and the receiving subspace.

For example, the beam gain loss constraint condition is denoted as $\gamma_1$, and there is a relationship between the scrambling factor $\sigma^2$ and the singular value matrix $D$ determined based on the second channel matrix. The relationship is shown in the following Formula (25):

$$\sigma^2 = f(D, \gamma_1) \quad \text{Formula (25)}$$

Formula (26) can be obtained based on Formula (25):

$$\max_{i \in \{0, N_r-1\}} \left( \frac{\lambda_{2,i}}{\lambda_{2,i}^2 + \sigma^2} \right) < \gamma_1 \qquad \text{Formula (26)}$$

$\lambda_{2,i}$ represents a diagonal element of the singular value feature matrix D of the second channel matrix H2, i represents an $i^{th}$ diagonal element, and $\lambda_{2,i}$ represents an $i^{th}$ eigenvalue. To minimize the beam gain loss, it is required that $\sigma^2 \to +\infty$.

In addition, there is also a relationship between the scrambling factor $\sigma^2$ and the orthogonality constraint condition $\gamma_2$ of the receiving subspace of the second channel matrix $H_2$. As shown in Formula (27):

$$\sigma^2 = g(\gamma_2) \qquad \text{Formula (27)}$$

To meet the orthogonality of the receiving subspace of the second channel matrix $H_2$ as much as possible, the following Formula (28) is obtained according to Formula (27):

$$\min_i \frac{\lambda_{2,i}^2}{\lambda_{2,i}^2 + \sigma^2} \approx 1 \qquad \text{Formula (28)}$$

In Formula (28), it is required that $\sigma^2 \to 0$.

According to the foregoing Formula (26) and Formula (28), it can be learned that selecting a proper scrambling factor $\sigma^2$ can balance between a weight power loss and orthogonality of receiving subspaces, and a serious beam gain loss is avoided while orthogonality of the receive subspaces is ensured.

In the sub-manner 4, the server continues to perform step 7 and step 8 after step 3.

Step 7: The server performs SVD decomposition on the third projection matrix to obtain a largest sending subspace of the third projection matrix.

It can be learned from the foregoing that the largest sending subspace of the third projection matrix $\hat{H}_2$ is $\hat{V}_2(:, 1:r_2)$. Based on an idea of interference alignment, if a space alignment vector $V_{1A}$ exists, Formula (29) can be obtained:

$$H_2 V_{1A} = (\tilde{U}_1 \tilde{U}_1^H) H_2 \qquad \text{Formula (29)}$$

In Formula (29), $V_{1A}$ is a to-be-solved value.

The second downlink sending weight determined according to Formula (29) is shown in Formula (30):

$$W_2 = V_{1A} \hat{V}_2(:, 1:r_2) \qquad \text{Formula (30)}$$

The second channel matrix $H_2$ is split into two parts, and Formula (31) is obtained:

$$H_2 = [U_{2,1} \ U_{2,2}] \begin{bmatrix} D_{2,1} & 0 \\ 0 & D_{2,2} \end{bmatrix} \begin{bmatrix} V_{2,1}^H \\ V_{2,2}^H \end{bmatrix} = H_{2,1} + H_{2,2} \qquad \text{Formula (31)}$$

SVD decomposition is performed on the second channel matrix $H_2$: $H_2 = U_2 D_2 V_2$. After the second channel matrix $H_2$ is split into two parts, $H_{2,1}$ and $H_{2,2}$ are obtained. Correspondingly, SVD decomposition results of the two parts are also separately represented, as shown in Formula (31).

Formula (32) can be obtained according to Formula (31):

$$(H_{2,1})^{-1} = V_{2,1}(D_{2,1})^{-1} U_{2,1}^H \qquad \text{Formula (32)}$$

To avoid a case in which feature space distribution of the second channel matrix $H_2$ is uneven, a minimum eigenvalue is smallest, and a severe beam gain loss is caused, partial space of the second channel matrix $H_2$ is selected herein for inversion. In this case, the space alignment vector $V_{1A}$ is represented by using the following Formula (33):

$$V_{1A} \approx (H_{2,1})^{-1} U_{2,1}^H (\tilde{U}_1 \tilde{U}_1^H) H_2 \qquad \text{Formula (33)}$$

According to Formula (33), the second downlink sending weight $W_2$ is represented by using the following Formula (34):

$$W_2 = \frac{1}{\eta} \cdot (H_{2,1})^{-1} (\tilde{U}_1 \tilde{U}_1^H) H_2 \hat{V}_2(:, 1:r_2) = \qquad \text{Formula (34)}$$
$$\frac{1}{\eta} \cdot (H_{2,1})^{-1} \hat{U}_2(:, 1:r_2) \hat{D}_2(:, 1:r_2)$$

The equivalent channel of the second channel of the second transmission point is represented by using the following Formula (35):

$$H_2 W_2 = U_{2,1} U_{2,1}^H (\tilde{U}_1 \tilde{U}_1^H) H_2 \hat{V}_2(:, 1:r_2) \qquad \text{Formula (35)}$$

In Formula (35), because $U_{2,1}$ represents a part of the receiving subspace of $U_2$, $U_{2,1} U_{2,1}^H \neq I$, and it cannot be ensured that $H_2 W_2$ is completely aligned with the remaining receiving subspace $\tilde{U}_1$ of the receiving subspace $U_1$ of the first transmission point. I represents a unit matrix, and elements on a main diagonal of the unit matrix are 1, and elements at other positions are 0.

In this solution, for a scenario with a high orthogonality requirement, selection of inversion subspaces should be appropriately increased to ensure orthogonality; and for a scenario with a low orthogonality requirement, selection of inversion subspaces can be appropriately reduced to reduce a beam gain loss.

A projection process exists in both the second implementation and the fourth implementation. The fourth implementation is used as an example. In this implementation, the third projection matrix $\hat{H}_2$ is obtained by projecting the second channel matrix $H_2$ to the remaining receiving subspace $\tilde{U}_1$ in the receiving subspace $U_1$ of the first transmission point. In this process, if the second channel matrix $H_2$ is orthogonal to the remaining receiving subspace $\tilde{U}_1$, a signal loss after projection is excessively large. To balance between the signal projection loss and the orthogonality of the receiving subspace of the second channel matrix, a disturbance factor $\xi$ is introduced. In this case, the projection process is shown in the following Formula (36):

$$(\tilde{U}_1 \tilde{U}_1^H + \xi \cdot I) H_2 \qquad \text{Formula (36)}$$

It can be learned from Formula (36) that, when external noise/interference is large, to ensure that signal strength of each transmission point is large, a value of the disturbance factor $\xi$ should be increased. When the external noise/interference is small, an orthogonalization granularity between the transmission points is increased, to reduce interference between the transmission points. In this case, the value of the disturbance factor $\xi$ should be decreased.

In this solution, the disturbance factor is adjusted in the projection process, to resolve a problem that interference of each transmission point in the coordinated set and the beam gain loss are excessively large, thereby flexibly balancing a gain loss and orthogonality of receiving subspaces in the projection process.

In the foregoing embodiment, the server determines the first downlink sending weight $W_1$ of the first transmission point, and determines the second downlink sending weight $W_2$ of the second transmission point based on the first downlink transmission weight $W_1$. Further, the server corrects the first downlink sending weight $W_1$ by using the second downlink transmit weight $W_2$.

It should be noted that, although in the foregoing embodiments, the server determines the first downlink sending weight $W_1$ according to Formula (1) and Formula (2), this is not limited to some embodiments of this application. For example, an initial first downlink sending weight $W_1'$ is preset, the initial $W_1'$ is used as the first downlink sending weight $W_1$, and the second downlink sending weight $W_2$ is determined by using any one of the foregoing feasible implementations. Then, the second downlink sending weight $W_2$ is used as a known value, the first downlink sending weight $W_1$ is used as a to-be-solved value, and the first downlink sending weight $W_1$ is obtained through calculation in any one of the foregoing feasible manners. In addition, the server may further iterate for a plurality of times, to obtain a corrected first downlink sending weight $W_1$ as the to-be-solved value, and the first downlink sending weight $W_1$ and the second downlink sending weight $W_2$ are obtained through calculation in any one of the foregoing feasible manners.

When the first downlink sending weight $W_1$ is not $W_1=V_1(:,1:r_1)$, $U_1(:,1:r_1)$ in the foregoing embodiment represents a largest receiving subspace of an equivalent channel $H_1W_1$ of the first channel.

In the foregoing embodiments, an example in which a coordinated set includes only two transmission points is used to describe some embodiments of this application in detail. However, some embodiments of this application are not limited thereto. In another feasible implementation, for example, there are three or more transmission points in a coordinated set. In this case, when the server determines a downlink sending weight of each transmission point, if only orthogonality between a first receiving subspace of a first transmission point and a receiving subspace of another transmission point is considered, for any transmission point other than the first transmission point in the coordinated set, the server determines a second downlink sending weight of the transmission point based on a first downlink sending weight of the first transmission point.

However, because interference may be caused between receiving subspaces of any two transmission points in the coordinated set, when determining the downlink sending weight, the server first determines the downlink sending weight of the first transmission point, and then determines the second downlink sending weight of the second transmission point. In this case, the first transmission point is the $1^{st}$ transmission point, in the coordinated set, whose downlink sending weight is determined by the server, and the second transmission point is the $2^{nd}$ transmission point, in the coordinated set, whose downlink sending weight is determined by the server. Then, the server determines a third downlink sending weight of a fourth transmission point, where the fourth transmission point is the 3rd transmission point, in the coordinated set, whose downlink sending weight is determined by the server. Similarly, each time the server determines a downlink sending weight of a transmission point, a transmission point that has been orthogonalized, for example, a second transmission point or a fourth transmission point, needs to be considered in addition to the first transmission point. For example, a coordinated set includes 10 transmission points, identifiers of the 10 transmission points are sequentially 1 to 10, and a transmission point numbered 1 is the first transmission point. The server sequentially determines downlink sending weights of the transmission points. When the server determines a downlink sending weight of a transmission point numbered 7, downlink sending weights of transmission points numbered 2 to 6 are further considered in addition to a downlink sending weight of the first transmission point, namely, the transmission point numbered 1.

The following uses an example in which a coordinated set includes three transmission points to describe in detail how the server determines downlink sending weights of the three transmission points. For example, the server first determines a first transmission point from the three transmission points, and then sorts the remaining two transmission points in ascending order of receive powers, uses a transmission point with a lower receive power as a second transmission point, and uses a transmission point with a higher receive power as a third transmission point. Then, the server sequentially determines a first downlink sending weight of the first transmission point, a second downlink sending weight of the second transmission point, and a third downlink sending weight of the third transmission point. For a process of determining the first downlink sending weight $W_1$ and the second downlink sending weight $W_2$, refer to the foregoing embodiments. Details are not described herein again. The following uses an example in which a third channel matrix of a third channel between the electronic device and the third transmission point is $H_3$ to describe how the server determines the third downlink sending weight $W_3$ of the third transmission point.

For example, the server determines the third downlink sending weight $W_3$ by using the first implementation. In this case, an implementation is as follows: The server maps a precoded equivalent matrix $H_3W_3$ of the third transmission point to zero-receiving subspaces of $H_1W_1$ and $H_2W_2$, to obtain the following Formula (37):

$$H_3W_3=U_1(:,r_1+r_2+1:r_1+r_2+r_3)=\tilde{U}_1 \qquad \text{Formula (37)}$$

$\gamma_3$ represents a quantity of data streams to be sent by the third transmission point.

The third downlink sending weight of the third transmission point is shown in the following Formula (4):

$$W_3=H_3^H(H_3H_3^H+\sigma^2 I)^{-1}\tilde{U}_1 \qquad \text{Formula(38)}$$

Other implementations are as follows: The server performs SVD decomposition on the third channel matrix $H_3$ to obtain a largest receiving subspace $U_3(:,1:r_3)$ of the third channel, $r_3$ represents a quantity of data streams to be sent by the third transmission point, and $U_3(:,1:r_3)$ represents that the first column to the $r_3^{th}$ column are selected from a left singular matrix $U_3$ obtained by performing SVD decomposition on $H_3$. Then, the server projects the largest receiving subspace $U_3(:,1:r_3)$ of the third channel to $U_1(:, r_1+r_2+1:r_1+r_2+r_3)$, to obtain $U_3^{Proj}$. Then, the server performs Schmitt orthogonalization on $U_3^{Proj}$. During Schmitt orthogonalization, in addition to orthogonality of receiving subspaces of $U_3^{Proj}$, orthogonality of a largest receiving subspace of an equivalent channel of the second channel needs to be considered.

For another example, the server determines the third downlink sending weight $W_3$ by using the second implementation. In this case, during orthogonalization processing, subspaces of the largest receiving subspace $U_3(:,1:r_3)$ of the third channel need to be projected to a largest receiving subspace $U_1(:,1:r_1)$ of the first channel, $\bar{U}_2^{Proj}(:,1:r_2)$, and a receiving subspace that is already orthogonalized and that is in a largest receiving subspace $U_3(:,1:r_3)$ of the third channel in sequence, and vertical components need to be obtained, so that the subspaces are orthogonal to each other.

For another example, the server determines the third downlink sending weight $W_3$ by using the third implementation. In this case. Formula (14) is transformed into Formula (39):

$$\frac{W_3^H R_3 W_3}{\|W_1^H R_{13} W_3\| + \|W_2^H R_{23} W_3\| + \sigma^2} \qquad \text{Formula (39)}$$

$R_3$ represents a covariance matrix of the third transmission point, $R_{13}$ represents a cross covariance matrix between the first transmission point and the second transmission point, and $R_{23}$ represents a cross covariance matrix between the third transmission point and the second transmission point $$\tilde{R}_3 = \left(\tilde{V}_c \tilde{V}_c^H\right) R_3 \left(\tilde{V}_c \tilde{V}_c^H\right)$$

is calculated subsequently, where $\tilde{V}_c$ represents zero spaces of $W_1^H R_{13}$ and $W_2^H R_{23}$.

For another example, the server determines the third downlink sending weight $W_3$ by using the fourth implementation. In this case, the server projects the third channel matrix $H_3$ to a remaining receiving subspace $\tilde{U}_1$ of the receiving subspace $U_1$ of the first transmission point and a remaining receiving subspace $\hat{U}_2(:, r_2+1:\text{end})$ of the largest receiving subspace $\hat{U}_2(:,1:r_2)$ of the third projection matrix $\hat{H}_2$ of the second transmission point. That is, the space to which the projection is performed is $[\tilde{U}_1 \hat{U}_2(:, r_2+1:\text{end})]$.

Figure 7:
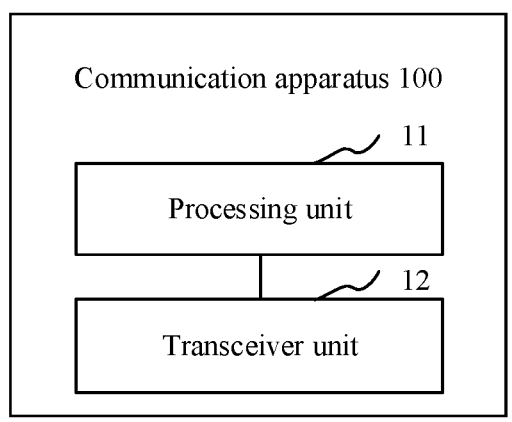
FIG. 7 is a schematic diagram of a structure of a communication apparatus according to an embodiment of this application.

FIG. 7 is a schematic diagram of a structure of a communication apparatus according to an embodiment of this application. The communication apparatus in this embodiment is the foregoing second transmission point, or is a chip used in the second transmission point. The communication apparatus may be configured to perform a function of the second transmission point in the foregoing embodiments. As shown in FIG. 7, a communication apparatus 100 includes a processing unit 11 (e.g., processing circuit) and a transceiver unit 12 (e.g., transceiver circuit).

The processing unit 11 is configured to: obtain a second downlink sending weight of a second transmission point, and process a data stream based on the second downlink sending weight, where the second downlink sending weight is determined based on a first downlink sending weight of a first transmission point, the first transmission point and the second transmission point belong to a same coordinated set, and each transmission point in the coordinated set serves an electronic device based on non-coherent joint transmission.

The transceiver unit 12 is configured to send the processed data stream.

In a feasible design, the transceiver unit 12 is further configured to receive the second downlink sending weight from a server; or the transceiver unit 12 is father configured to receive the second downlink sending weight from a third transmission point, where the third transmission point is a serving transmission point in the coordinated set.

The communication apparatus provided in some embodiments may perform actions of the second transmission point in the foregoing embodiments. Implementation principles and technical effects of the communication apparatus are similar to those in the foregoing embodiments, and details are not described herein again.

Figure 8:
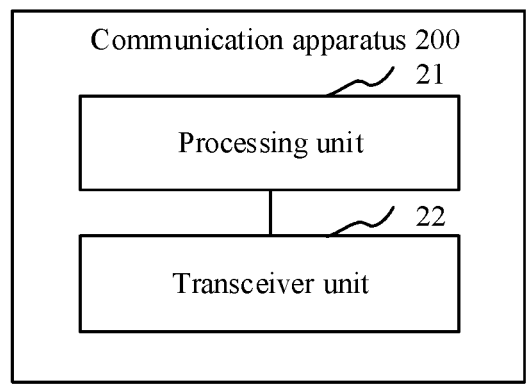
FIG. 8 is a schematic diagram of a structure of a communication apparatus according to an embodiment of this application.

FIG. 8 is a schematic diagram of a structure of a communication apparatus according to an embodiment of this application. The communication apparatus in this embodiment is used in the foregoing server or serving transmission point, or the communication apparatus is used in a chip of the server or a chip of the server transmission point. As shown in FIG. 8, a communication apparatus 200 includes a processing unit 21 and a transceiver unit 22.

The processing unit 21 configured to determine a second downlink sending weight of a second transmission point based on a first downlink sending weight of a first transmission point, where the first transmission point and the second transmission point belong to a same coordinated set, and each transmission point in the coordinated set serves an electronic device based on non-coherent joint transmission.

The transceiver unit 22 is configured to send the second downlink sending weight to the second transmission point.

In a feasible design, the processing unit 21 is configured to: determine a zero-receiving subspace of a first channel based on the first downlink sending weight; and determine the second downlink sending weight based on the zero-receiving subspace of the first channel, where the first channel is a channel between the first transmission point and the electronic device.

In a feasible design, when determining the second downlink sending weight based on the zero-receiving subspace of the first channel, the processing unit 21 is configured to determine the second downlink sending weight based on the zero-receiving subspace of the first channel and a second channel matrix of a second channel, where the second channel is a channel between the second transmission point and the electronic device.

In a feasible design, when determining the second downlink sending weight based on the zero-receiving subspace of the first channel, the processing unit 21 is configured to: determine a largest receiving subspace of a second channel based on a second channel matrix of the second channel between the second transmission point and the electronic device; project the largest receiving subspace of the second channel to the zero-receiving subspace of the first channel, to obtain a first projection matrix; perform Schmidt orthogonalization on the first projection matrix to obtain a first orthogonal matrix, and determine the second downlink sending weight based on the first orthogonal matrix and the second channel matrix of the second channel.

In a feasible design, the processing unit 21 is configured to: determine a largest receiving subspace of a second channel based on a second channel matrix of the second channel between the second transmission point and the electronic device; determine a second orthogonal matrix based on subspaces of the largest receiving subspace of the second channel, a largest receiving subspace of a first channel matrix, and the largest receiving subspace of the second channel matrix; and determine the second downlink sending weight based on the second channel matrix and the second orthogonal matrix.

In a feasible design, the processing unit 21 is configured to: determine a cross covariance matrix of a first channel and a second channel based on a first channel matrix of the first channel between the first transmission point and the electronic device and a second channel matrix of the second channel between the second transmission point and the electronic device; determine a product matrix based on the cross covariance matrix and the first downlink sending weight, wherein the product matrix indicates a product of a conjugate transposed matrix of the first downlink sending weight and the cross covariance matrix; and determine the second downlink sending weight based on the product matrix.

In a feasible design, when determining the second downlink sending weight based on the product matrix, the processing unit 21 is configured to: determine a zero-sending subspace of the product matrix; project the second channel matrix to the zero-sending subspace of the product matrix, to obtain a second projection matrix; determine a covariance matrix of the second projection matrix; and perform SVD on the covariance matrix of the second projection matrix to determine the second downlink sending weight, wherein the second downlink sending weight is a largest sending space of the covariance matrix of the second projection matrix.

In a feasible design, when determining the second downlink sending weight based on the product matrix, the processing unit 21 is configured to: determine the second downlink sending weight based on the product matrix, the first downlink sending weight, a covariance matrix of the second channel matrix, and the cross covariance matrix of the first channel and the second channel.

In a feasible design, the processing unit 21 is configured to: project a second channel matrix of a second channel between the second transmission point and the electronic device to a remaining receiving subspace of a first channel matrix, to obtain a third projection matrix; and determine the second downlink sending weight based on the third projection matrix, where the remaining receiving subspace is a space other than a largest receiving subspace of the first channel matrix in receiving spaces of the first channel matrix.

In a feasible design, when determining the second downlink sending weight based on the third projection matrix, the processing unit 21 is configured to: perform SVD on the third projection matrix to obtain a largest receiving subspace of the third projection matrix; and determine the second downlink sending weight based on the largest receiving subspace of the third projection matrix and the second channel matrix.

In a feasible design, before the determining a second downlink sending weight of a second transmission point based on a first downlink sending weight of a first transmission point, the processing unit 21 is further configured to: determine a singular value matrix based on the second channel matrix of the second channel; and determine a scrambling factor based on the singular value matrix, a beam gain loss constraint condition, and an orthogonality constraint condition, where the beam gain loss constraint condition indicates a condition that a gain loss meets in an inversion scrambling process, and the scrambling factor balances orthogonality between the gain loss and the receiving subspace.

In a feasible design, when determining the second downlink sending weight based on the third projection matrix, the processing unit 21 is configured to: perform SVD on the third projection matrix to obtain a largest sending subspace of the third projection matrix; and determine the second downlink sending weight based on the largest sending subspace of the third projection matrix and a part of receiving subspaces of the second channel matrix.

In a feasible design, the processing unit 21 is further configured to determine a disturbance factor, where the disturbance factor balances a gain loss and orthogonality of receive subspaces in a projection process.

In a feasible design, before the determining a second downlink sending weight of a second transmission point based on a first downlink sending weight of a first transmission point, the processing unit 21 is further configured to: determine a receive power of each transmission point in the coordinated set, to obtain a plurality of receive powers; and determine a minimum receive power from the plurality of receive powers, and use a transmission point corresponding to the minimum receive power as the first transmission point.

In a feasible design, before the processing unit 21 determines a second downlink sending weight of a second transmission point based on a first downlink sending weight of a first transmission point, the transceiver unit 22 is further configured to receive the first channel matrix from the first transmission point and the second channel matrix from the second transmission point, where the first channel matrix is a channel matrix of the first channel between the first transmission point and the electronic device, and the second channel matrix is a channel matrix of the second channel between the second transmission point and the electronic device.

In a feasible design, the first transmission point is the $1^{st}$ transmission point, in the coordinated set, whose downlink sending weight is determined by the server, and the second transmission point is the $2^{nd}$ transmission point, in the coordinated set, whose downlink sending weight is determined by the server.

In a feasible design, after determining the second downlink sending weight of the second transmission point based on the first downlink sending weight of the first transmission point, the processing unit 21 is further configured to determine a third downlink sending weight of a fourth transmission point, where the fourth transmission point is the 3rd transmission point, in the coordinated set, whose downlink sending weight is determined by the server.

In a feasible design, before determining the second downlink sending weight of the second transmission point based on the first downlink sending weight of the first transmission point, the processing unit 21 is further configured to determine a first downlink sending weight of the first transmission point based on the first channel matrix of the first channel between the first transmission point and the electronic device, where the first downlink sending weight is a largest sending subspace of the first channel matrix.

The communication apparatus provided in some embodiments may perform actions of the server in the foregoing embodiments. Implementation principles and technical effects of the communication apparatus are similar to those in the foregoing embodiments, and details are not described herein again.

It should be noted that, it should be understood that the transceiver unit is, for example, a transceiver in actual implementation. The processing unit is, for example, implemented in a form of software invoked by a processing element, or implemented in a form of hardware. For example, the processing unit may be a separately disposed processing element, or may be integrated into a chip of the foregoing apparatus for implementation. In addition, the processing unit may alternatively be stored in a memory of the foregoing apparatus in a form of program code, and is invoked by a processing element of the foregoing apparatus to perform a function of the processing unit. In addition, all or some of the units are integrated together, or implemented independently. The processing element described herein is, for example, an integrated circuit, and has a signal processing capability. In an implementation process, steps of the foregoing method or the foregoing units is, for example, implemented by using a hardware integrated logical circuit in a processor element, or by using instructions in the form of software.

For example, the foregoing units are configured as one or more integrated circuits for performing the foregoing methods, for example, one or more application specific integrated circuits (ASICs), one or more microprocessors (DSPs), or one or more field programmable gate arrays (FPGAs). For another example, when one of the foregoing units is implemented in a form of program code invoked by a processing element, the processing element may be a general-purpose processor, for example, a central processing unit (CPU) or another processor that can invoke the program code. For still another example, the units are integrated and implemented in a form of a system-on-a-chip (SOC).

Figure 9:
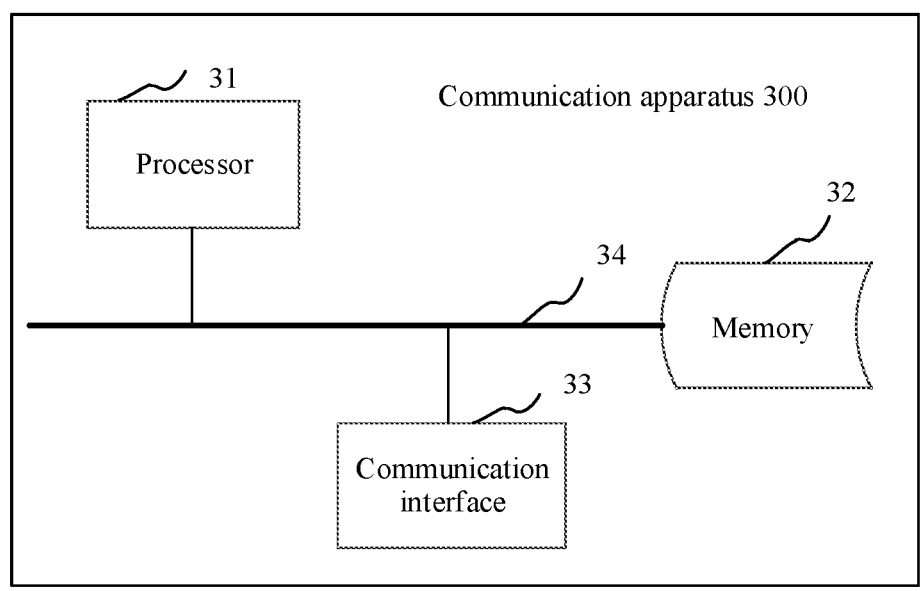
FIG. 9 is a schematic diagram of a structure of another communication apparatus according to an embodiment of this application.

FIG. 9 is a schematic diagram of a structure of another communication apparatus according to an embodiment of this application. As shown in FIG. 9, the communication apparatus 300 includes: a processor 31 and a memory 32.

The memory 32 stores computer-executable instructions.

The processor 31 executes the computer executable instructions stored in the memory 32, so that the processor 31 performs the gateway station handover method performed by the terminal device; or the processor 31 performs the gateway station handover method performed by the source gateway station; or the processor 31 performs the gateway station handover method performed by the target gateway station.

For a specific implementation process of the processor 31, refer to the foregoing method embodiments. Implementation principles and technical effects thereof are similar, and details are not described herein again in this embodiment.

Optionally, the communication apparatus 300 further includes a communication interface 33. The processor 31, the memory 32, and the communication interface 33 may be connected to each other through a bus 34.

In the foregoing implementation of the communication apparatus, the memory and the processor are directly or indirectly electrically connected to each other, to implement data transmission or interaction. In other words, the memory and the processor are connected by using an interface or integrated together. For example, these elements may be electrically connected to each other by using one or more communication buses or signal lines, for example, may be connected by using a bus. The memory stores computer executable instructions for implementing a data access control method, including at least one software function module stored in the memory in a form of software or firmware. The processor executes various function applications and data processing by running the software program and module stored in the memory.

The memory includes, but is not limited to, a random access memory (RAM), a read-only memory (ROM), a programmable read-only memory (PROM), an erasable read-only memory (EPROM), an electrically erasable read-only memory (EEPROM), or the like. The memory is configured to store a program, and the processor executes the program after receiving execution instructions. Further, the software program and the module in the memory may further include an operating system. The operating system may include various software components and/or drivers used for system task management (for example, memory management, storage device control, and power management), and may communicate with various hardware or software components to provide a running environment of other software components.

The processor is an integrated circuit chip, and has a signal processing capability. The processor is a general-purpose processor, including a central processing unit (CPU), a network processor (NP), or the like, and can implement or perform the methods, steps, and logical block diagrams disclosed in embodiments of this application. The general-purpose processor may be a microprocessor, or the processor may be any conventional processor or the like.

Based on the above, this application further provides a chip, including a logic circuit and an input interface. The input interface is configured to obtain to-be-processed data. The logic circuit is configured to perform the technical solution of the second transmission point in the foregoing method embodiment on the to-be-processed data, to obtain processed data.

Optionally, the chip may further include an output interface, where the output interface is configured to output processed data. The to-be-processed data obtained by the input interface includes a to-be-sent data stream, a second downlink sending weight, and the like, and the processed data output by the output interface includes a weighted data stream and the like.

This application further provides a chip, including a logic circuit and an output interface. The logic circuit is configured to perform the technical solution of the server in the foregoing method embodiment on to-be-processed data, to obtain processed data. The output interface is configured to output the processed data.

Optionally, the chip may further include an input interface, the input interface is configured to obtain to-be-processed data. The to-be-processed data includes a first channel matrix, a second channel matrix, and the like. The processed data output by the output interface includes a second downlink sending weight and the like.

This application further provides a computer-readable storage medium. The computer-readable storage medium stores a program. When being executed by a processor, the program is configured to perform the technical solution of the second transmission point in the foregoing embodiment.

This application further provides a computer-readable storage medium. The computer-readable storage medium stores a program. When being executed by a processor, the program is configured to perform the technical solution of the server in the foregoing embodiment.

An embodiment of this application further provides a computer program product. When the computer program product runs on a communication apparatus, the communication apparatus is enabled to perform the technical solution of the second transmission point in the foregoing embodiment, or the communication apparatus is enabled to perform the technical solution of the server in the foregoing embodiment.

An embodiment if this application further provides a communication system, including a coordinated set, an electronic device, and the communication apparatus implemented according to any one of the possible implementations. The coordinated set includes a first transmission point and at least one second transmission point. The communication apparatus is configured to determine a second downlink sending weight of a second transmission point in the coordinated set based on a first downlink sending weight of the first transmission point in the coordinated set. The second transmission point is configured to: weight a data stream based on the second downlink sending weight from the communication apparatus, and send the weighted data stream. The electronic device is configured to receive the weighted data stream sent by the second transmission point.

A person of ordinary skill in the art should understand that all or some of the steps of the method embodiments may be implemented by a program instructing relevant hardware. The foregoing program may be stored in a computer-readable storage medium. When the program runs, the steps of the method embodiments are performed. The foregoing storage medium includes any medium that can store program code, such as a ROM, a RAM, a magnetic disk, or an optical disc. A specific medium type is not limited in this application.

What is claimed is:

1. A data sending method, comprising:
   based on a first downlink sending weight of a first transmission point, determining a second downlink sending weight of a second transmission point, wherein the first transmission point and the second transmission point belong to a same coordinated set, and each transmission point in the coordinated set serves an electronic device based on non-coherent joint transmission; and
   sending the second downlink sending weight to the second transmission point.

2. The method according to claim 1, wherein the determining of the second downlink sending weight of the second transmission point based on the first downlink sending weight of the first transmission point comprises:
   determining a zero-receiving subspace of a first channel based on the first downlink sending weight, wherein the first channel is a channel between the first transmission point and the electronic device; and
   determining the second downlink sending weight based on the zero-receiving subspace of the first channel.

3. The method according to claim 2, wherein the determining of the second downlink sending weight based on the zero-receiving subspace of the first channel comprises:
   determining the second downlink sending weight based on the zero-receiving subspace of the first channel and a second channel matrix of a second channel, wherein the second channel is a channel between the second transmission point and the electronic device.

4. The method according to claim 2, wherein the determining of the second downlink sending weight based on the zero-receiving subspace of the first channel comprises:
   determining a largest receiving subspace of a second channel based on a second channel matrix of the second channel between the second transmission point and the electronic device;
   projecting the largest receiving subspace of the second channel to the zero-receiving subspace of the first channel, to obtain a first projection matrix;
   performing Schmidt orthogonalization on the first projection matrix to obtain a first orthogonal matrix; and
   determining the second downlink sending weight based on the first orthogonal matrix and the second channel matrix of the second channel.

5. The method according to claim 1, wherein the determining of the second downlink sending weight of the second transmission point based on the first downlink sending weight of the first transmission point comprises:
   determining a largest receiving subspace of a second channel based on a second channel matrix of the second channel between the second transmission point and the electronic device;
   determining a second orthogonal matrix based on subspaces of the largest receiving subspace of the second channel, a largest receiving subspace of a first channel matrix, and the largest receiving subspace of the second channel matrix; and
   determining the second downlink sending weight based on the second channel matrix and the second orthogonal matrix.

6. The method according to claim 1, wherein the determining of the second downlink sending weight of the second transmission point based on the first downlink sending weight of the first transmission point comprises:
   determining a cross covariance matrix of a first channel and a second channel based on a first channel matrix of the first channel between the first transmission point and the electronic device and a second channel matrix of the second channel between the second transmission point and the electronic device;
   determining a product matrix based on the cross covariance matrix and the first downlink sending weight, wherein the product matrix indicates a product of a conjugate transposed matrix of the first downlink sending weight and the cross covariance matrix; and
   determining the second downlink sending weight based on the product matrix.

7. The method according to claim 6, wherein the determining of the second downlink sending weight based on the product matrix comprises:
   determining a zero-sending subspace of the product matrix;
   projecting the second channel matrix to the zero-sending subspace of the product matrix, to obtain a second projection matrix;
   determining a covariance matrix of the second projection matrix; and
   performing singular value decomposition (SVD) on the covariance matrix of the second projection matrix to determine the second downlink sending weight, wherein the second downlink sending weight is a largest sending space of the covariance matrix of the second projection matrix.

8. An apparatus comprising:
   at least one processor, and a memory storing instructions for execution by the at least one processor;
   wherein, when executed, the instructions cause the apparatus to perform operations comprising:
   based on a first downlink sending weight of a first transmission point, determining a second downlink sending weight of a second transmission point, wherein the first transmission point and the second transmission point belong to a same coordinated set, and each transmission point in the coordinated set serves an electronic device based on non-coherent joint transmission; and
   sending the second downlink sending weight to the second transmission point.

9. The apparatus according to claim 8, wherein the determining of the second downlink sending weight of the second transmission point based on the first downlink sending weight of the first transmission point comprises:
   determining a zero-receiving subspace of a first channel based on the first downlink sending weight, wherein the first channel is a channel between the first transmission point and the electronic device; and
   determining the second downlink sending weight based on the zero-receiving subspace of the first channel.

10. The apparatus according to claim 9, wherein the determining of the second downlink sending weight based on the zero-receiving subspace of the first channel comprises:
- determining the second downlink sending weight based on the zero-receiving subspace of the first channel and a second channel matrix of a second channel, wherein the second channel is a channel between the second transmission point and the electronic device.

11. The apparatus according to claim 9, wherein the determining of the second downlink sending weight based on the zero-receiving subspace of the first channel comprises:
- determining a largest receiving subspace of a second channel based on a second channel matrix of the second channel between the second transmission point and the electronic device;
- projecting the largest receiving subspace of the second channel to the zero-receiving subspace of the first channel, to obtain a first projection matrix;
- performing Schmidt orthogonalization on the first projection matrix to obtain a first orthogonal matrix; and
- determining the second downlink sending weight based on the first orthogonal matrix and the second channel matrix of the second channel.

12. The apparatus according to claim 9, wherein the determining of the second downlink sending weight of the second transmission point based on the first downlink sending weight of the first transmission point comprises:
- determining a largest receiving subspace of a second channel based on a second channel matrix of the second channel between the second transmission point and the electronic device;
- determining a second orthogonal matrix based on subspaces of the largest receiving subspace of the second channel, a largest receiving subspace of a first channel matrix, and the largest receiving subspace of the second channel matrix; and
- determining the second downlink sending weight based on the second channel matrix and the second orthogonal matrix.

13. The apparatus according to claim 8, wherein the determining of the second downlink sending weight of the second transmission point based on the first downlink sending weight of the first transmission point comprises:
- determining a cross covariance matrix of a first channel and a second channel based on a first channel matrix of the first channel between the first transmission point and the electronic device and a second channel matrix of the second channel between the second transmission point and the electronic device;
- determining a product matrix based on the cross covariance matrix and the first downlink sending weight, wherein the product matrix indicates a product of a conjugate transposed matrix of the first downlink sending weight and the cross covariance matrix; and
- determining the second downlink sending weight based on the product matrix.

14. The apparatus according to claim 13, wherein the determining of the second downlink sending weight based on the product matrix comprises:
- determining a zero-sending subspace of the product matrix;
- projecting the second channel matrix to the zero-sending subspace of the product matrix, to obtain a second projection matrix;
- determining a covariance matrix of the second projection matrix; and
- performing singular value decomposition (SVD) on the covariance matrix of the second projection matrix to determine the second downlink sending weight, wherein the second downlink sending weight is a largest sending space of the covariance matrix of the second projection matrix.

15. An apparatus comprising a processor and a non-transitory computer-readable storage medium storing a program including instructions to be executed by the processor, wherein, when executed, the instructions cause the apparatus to perform operations comprising:
- based on a first downlink sending weight of a first transmission point, determining a second downlink sending weight of a second transmission point, wherein the first transmission point and the second transmission point belong to a same coordinated set, and each transmission point in the coordinated set serves an electronic device based on non-coherent joint transmission; and
- sending the second downlink sending weight to the second transmission point.

16. The apparatus according to claim 15, wherein the determining of the second downlink sending weight of the second transmission point based on the first downlink sending weight of the first transmission point comprises:
- determining a zero-receiving subspace of a first channel based on the first downlink sending weight, wherein the first channel is a channel between the first transmission point and the electronic device; and
- determining the second downlink sending weight based on the zero-receiving subspace of the first channel.

17. The apparatus according to claim 15, wherein the determining of the second downlink sending weight based on the zero-receiving subspace of the first channel comprises:
- determining the second downlink sending weight based on the zero-receiving subspace of the first channel and a second channel matrix of a second channel, wherein the second channel is a channel between the second transmission point and the electronic device.

* * * * *